US012587909B2

(12) United States Patent
Zhou et al.

(10) Patent No.: US 12,587,909 B2
(45) Date of Patent: Mar. 24, 2026

(54) RECONFIGURATION FOR LOWER LAYER MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Rajeev Kumar, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 18/045,720

(22) Filed: Oct. 11, 2022

(65) Prior Publication Data

US 2024/0121671 A1 Apr. 11, 2024

(51) Int. Cl.
*H04W 36/00* (2009.01)
*H04W 36/06* (2009.01)

(52) U.S. Cl.
CPC ....... *H04W 36/0016* (2013.01); *H04W 36/06* (2013.01)

(58) Field of Classification Search
CPC . H04W 36/08; H04W 76/27; H04W 36/0085; H04W 36/04; H04W 36/0005; H04W 36/0016; H04W 36/06
See application file for complete search history.

(56) References Cited

U.S. PATENT DOCUMENTS

| 2003/0002525 A1* | 1/2003 | Grilli | H04W 36/1443 |
| | | | 370/333 |
| 2008/0019380 A1* | 1/2008 | Hirano | H04W 36/0011 |
| | | | 370/331 |

(Continued)

OTHER PUBLICATIONS

Ericsson: "Execution Procedure for L1/L2 Based Inter-Cell Mobility", 3GPP TSG-RAN WG2 #119-bis-e, R2-2210331, 3rd Generation Partnership Project, Mobile Competence Centre, 650, Route Des Lucioles, F-06921 Sophia-Antipolis Cedex, France, vol. RAN WG2, No. Electronic Meeting, Oct. 10, 2022-Oct. 19, 2022, Sep. 30, 2022, 10 Pages, XP052263653, paragraph [0001]-paragraph [2.2.1].

(Continued)

*Primary Examiner* — Dung Hong
(74) *Attorney, Agent, or Firm* — QUALCOMM Incorporated

(57) ABSTRACT

Methods, systems, and devices for wireless communication are described. A user equipment (UE) may receive a first control message indicating a set of mobility parameters associated with a lower layer handover procedure, which may be a layer 1 (L1)/layer 2 (L2) handover procedure. The UE may receive a second control message indicating a first or second reset procedure, which may each indicate a respective set of operating parameters for a higher layer than L1/L2 in the protocol stack. The UE may perform the lower layover handover procedure, which may include switching from a first serving cell to a second serving cell. The UE may perform the first or second reset procedure based on the (Continued)

115-c 160-c

CU

First control message

405

Second control message

410

415
Perform lower layer handover procedure

420
Switching serving cells

425
Perform first reset procedure

430
Perform second reset procedure

400 switching, where the first reset procedure may include maintaining the operating parameters of the second serving cell, and the second reset procedure may include switching the operating parameters of the second serving cell.

30 Claims, 17 Drawing Sheets

(56) References Cited

U.S. PATENT DOCUMENTS

| | | | | |
|---|---|---|---|---|
| 2008/0159221 | A1 * | 7/2008 | Hirano | H04W 36/0016 |
| | | | | 370/331 |
| 2010/0118781 | A1 * | 5/2010 | Petrovic | H04L 69/324 |
| | | | | 370/328 |
| 2021/0235338 | A1 * | 7/2021 | Zhang | H04W 24/08 |
| 2021/0329515 | A1 * | 10/2021 | Sharma | H04W 80/02 |
| 2023/0199571 | A1 * | 6/2023 | Babaei | H04W 56/0015 |
| | | | | 370/331 |
| 2023/0362986 | A1 * | 11/2023 | Leng | H04W 74/0838 |
| 2023/0379769 | A1 * | 11/2023 | Ramachandra | H04W 74/0833 |
| 2023/0388871 | A1 * | 11/2023 | Guo | H04W 36/0069 |
| 2023/0422111 | A1 * | 12/2023 | Da Silva | H04B 7/06968 |
| 2024/0114403 | A1 * | 4/2024 | Latheef | H04W 36/0061 |
| 2025/0056343 | A1 * | 2/2025 | Awada | H04W 36/0058 |
| 2025/0227576 | A1 * | 7/2025 | Xu | H04W 36/0069 |
| 2025/0234259 | A1 * | 7/2025 | Abdul Latheef | H04W 36/0055 |
| 2025/0247750 | A1 * | 7/2025 | Xu | H04W 36/324 |

OTHER PUBLICATIONS

International Search Report and Written Opinion—PCT/US2023/074337—ISA/EPO—Jan. 8, 2024 (2207827WO).
OPPO: "Open Issues on Dynamic Switching for L1/L2 Mobility", 3GPP TSG-RAN WG2 Meeting #119bis electronic, R2-2209627, 3rd Generation Partnership Project, Mobile Competence Centre, 650, Route Des Lucioles, F-06921 Sophia-Antipolis Cedex, France, vol. RAN WG2, No. electronic, Oct. 1, 2022, Sep. 30, 2022, 4 Pages, XP052262956, Paragraph [0001]-Paragraph [0003].
ZTE Corporation., et al., "Candidate Solutions for L1/L2 Mobility", 3GPP TSG-RAN WG2 Meeting #119-e, R2-2208409, 3rd Generation Partnership Project, Mobile Competence Centre, 650, Route Des Lucioles, F-06921 Sophia-Antipolis Cedex, France, vol. RAN WG2, No. Online, Aug. 17, 2022-Aug. 26, 2022, Aug. 10, 2022, 19 Pages, XP052261718, The Whole Document, paragraph [2.5.2], figure 2.

\* cited by examiner

910

920

915

905

900

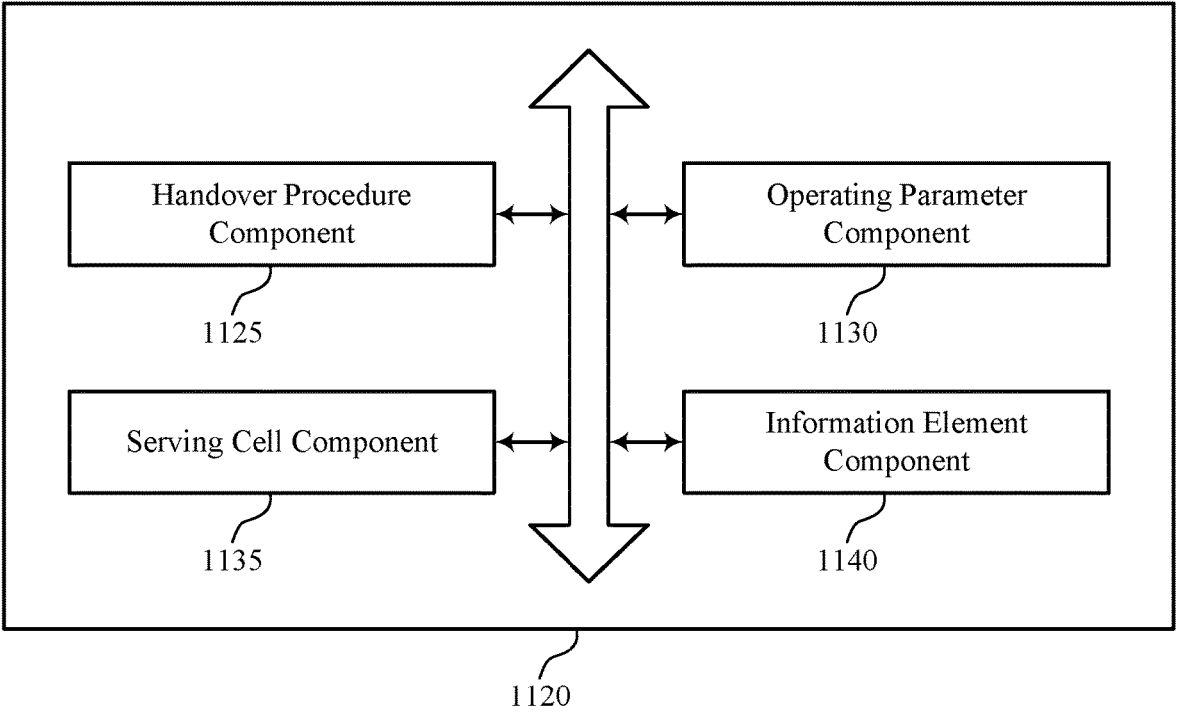
| Handover Procedure Component | Operating Parameter Component |
|---|---|
1125        1130
| Serving Cell Component | Information Element Component |
|---|---|
1135        1140
1120
1100
FIG. 11

130

105

115

Network
Entity

Transceiver

1210

Antenna

1215

Communications
Manager

1220

Memory

Code

1230

1225

1240

Processor

1235

1205

1200

Figure 13:
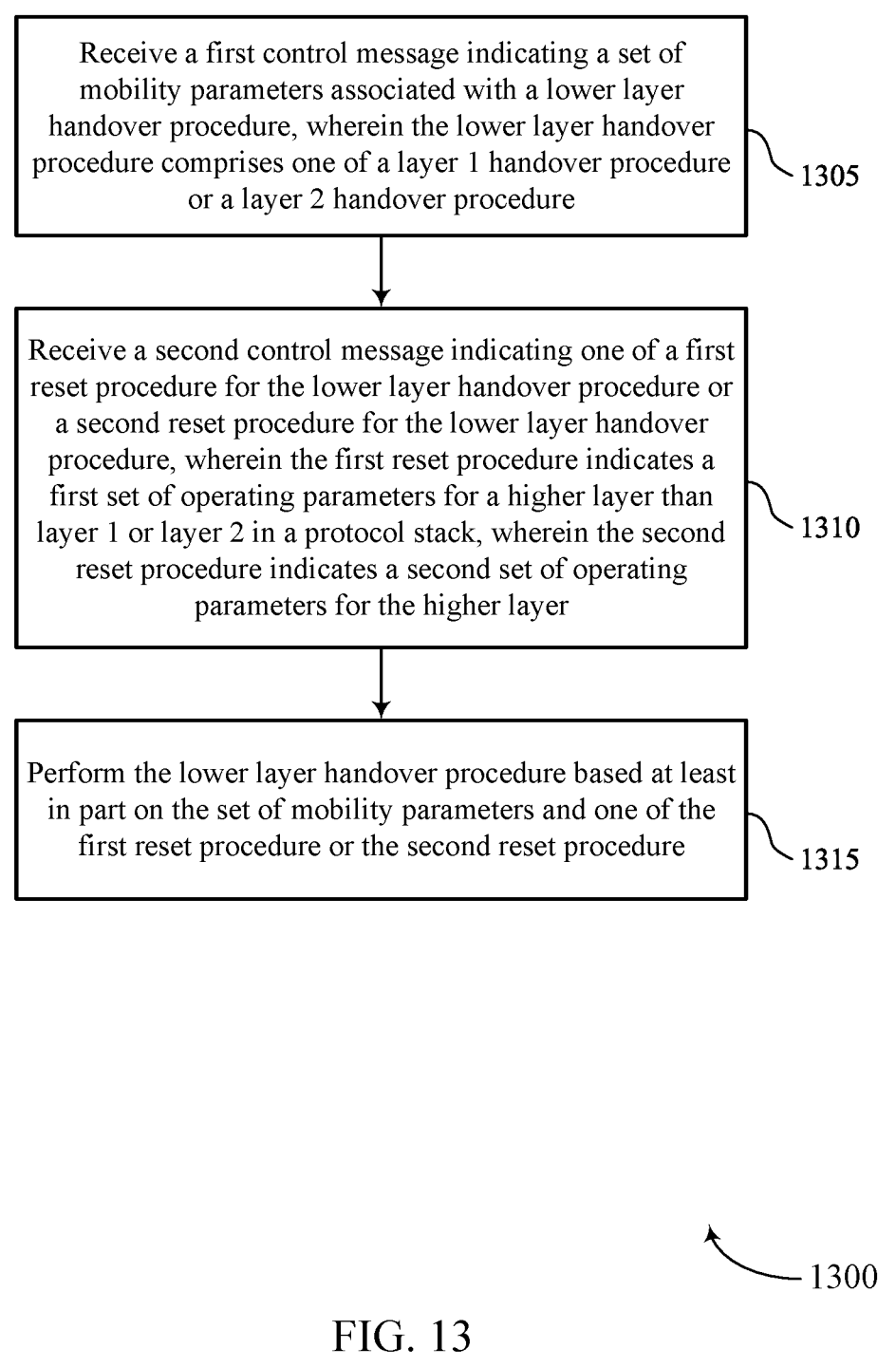

Receive a first control message indicating a set of mobility parameters associated with a lower layer handover procedure, wherein the lower layer handover procedure comprises one of a layer 1 handover procedure or a layer 2 handover procedure

1305

Receive a second control message indicating one of a first reset procedure for the lower layer handover procedure or a second reset procedure for the lower layer handover procedure, wherein the first reset procedure indicates a first set of operating parameters for a higher layer than layer 1 or layer 2 in a protocol stack, wherein the second reset procedure indicates a second set of operating parameters for the higher layer

1310

Perform the lower layer handover procedure based at least in part on the set of mobility parameters and one of the first reset procedure or the second reset procedure

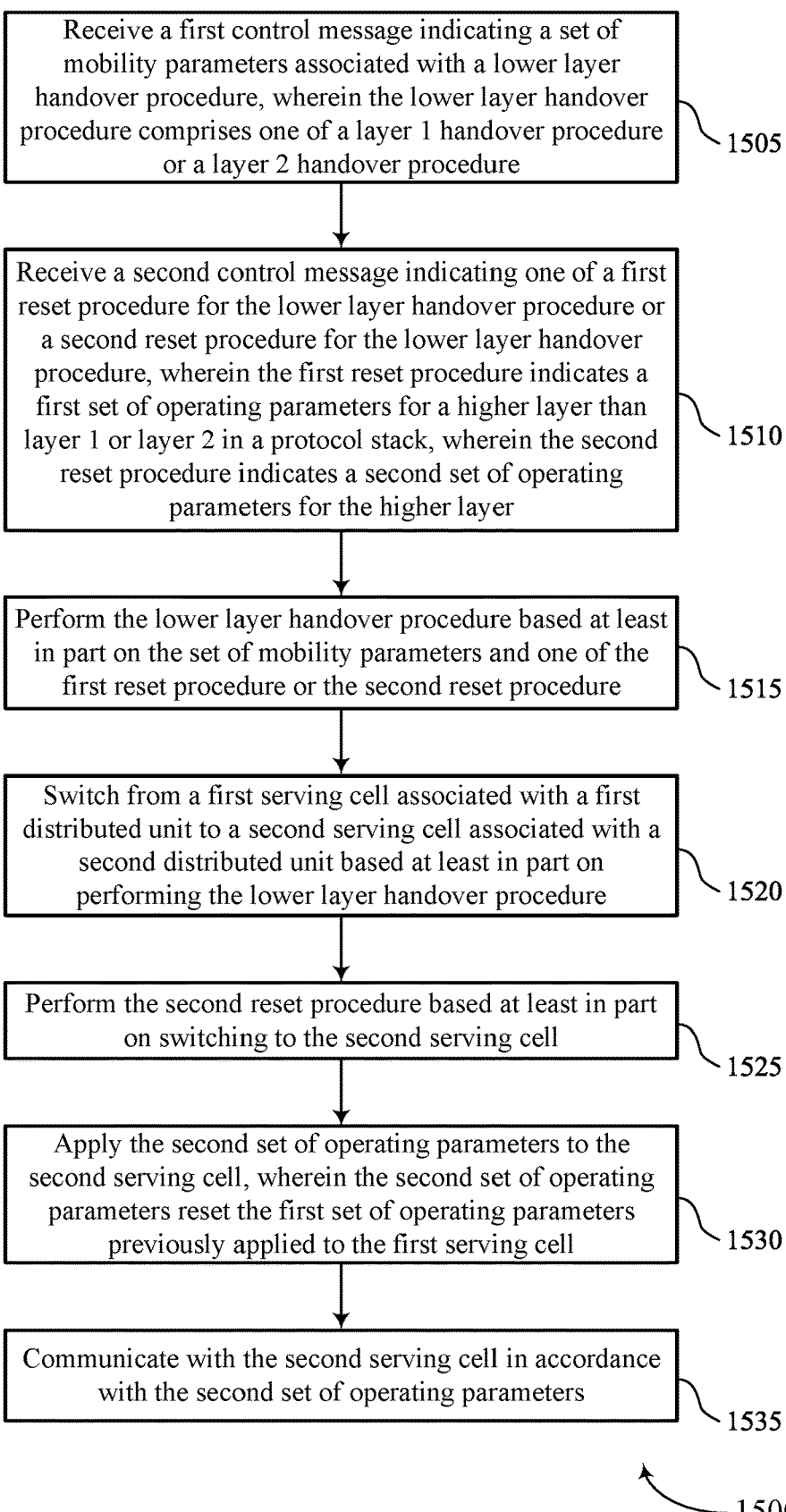

Receive a first control message indicating a set of mobility parameters associated with a lower layer handover procedure, wherein the lower layer handover procedure comprises one of a layer 1 handover procedure or a layer 2 handover procedure ⟍ 1505

Receive a second control message indicating one of a first reset procedure for the lower layer handover procedure or a second reset procedure for the lower layer handover procedure, wherein the first reset procedure indicates a first set of operating parameters for a higher layer than layer 1 or layer 2 in a protocol stack, wherein the second reset procedure indicates a second set of operating parameters for the higher layer ⟍ 1510

Perform the lower layer handover procedure based at least in part on the set of mobility parameters and one of the first reset procedure or the second reset procedure ⟍ 1515

Switch from a first serving cell associated with a first distributed unit to a second serving cell associated with a second distributed unit based at least in part on performing the lower layer handover procedure ⟍ 1520

Perform the second reset procedure based at least in part on switching to the second serving cell ⟍ 1525

Apply the second set of operating parameters to the second serving cell, wherein the second set of operating parameters reset the first set of operating parameters previously applied to the first serving cell ⟍ 1530

Communicate with the second serving cell in accordance with the second set of operating parameters ⟍ 1535

Output a first control message indicating a set of mobility parameters associated with a lower layer handover procedure, wherein the lower layer handover procedure comprises one of a layer 1 handover procedure or a layer 2 handover procedure

1605

Output a second control message indicating one of a first reset procedure for the lower layer handover procedure or a second reset procedure for the lower layer handover procedure, wherein the first reset procedure indicates a first set of operating parameters for a higher layer than layer 1 and layer 2 in a protocol stack, and wherein the second reset procedure indicates a second set of operating parameters for the higher layer

1610

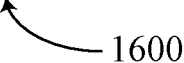

Figure 17:
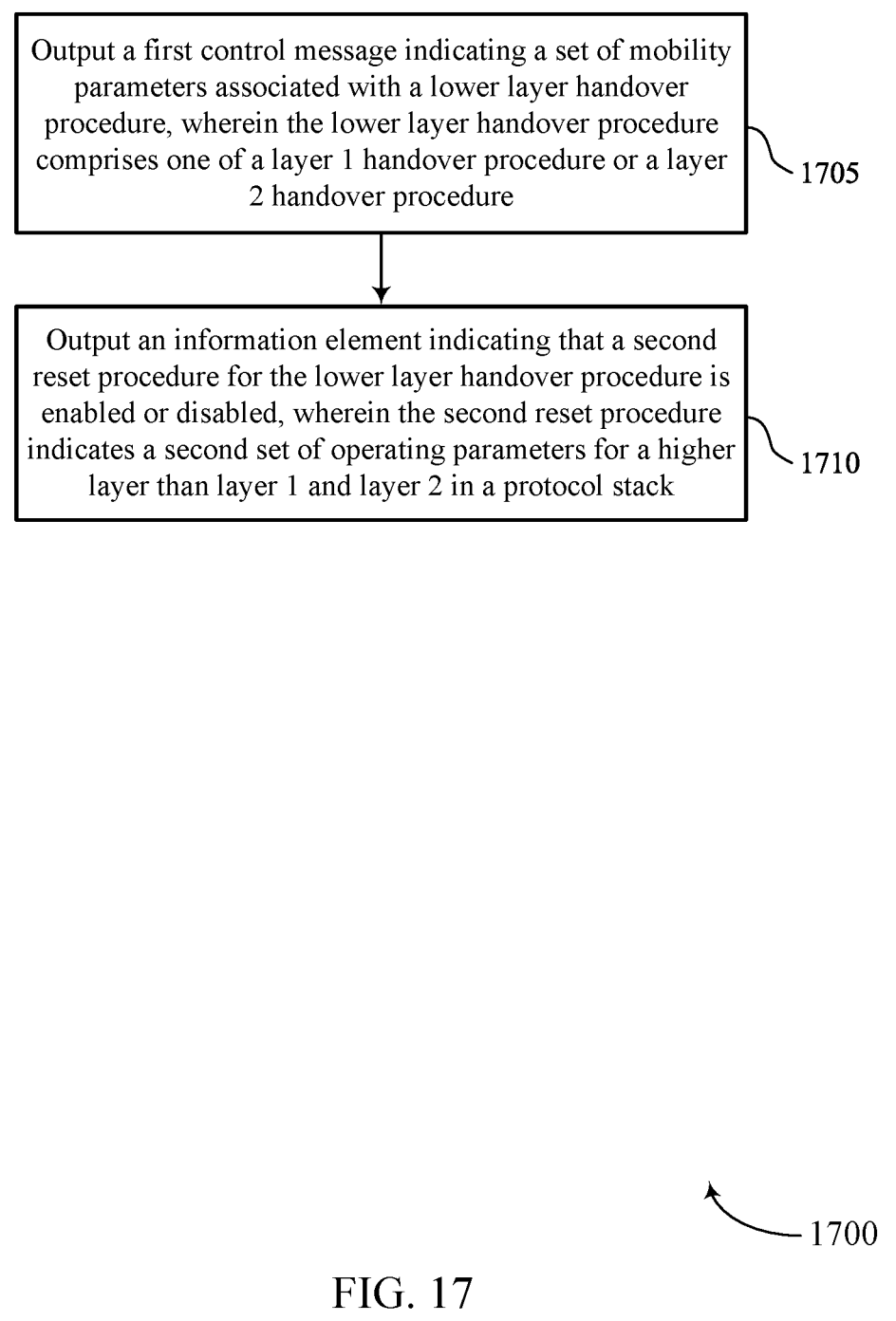

Output a first control message indicating a set of mobility parameters associated with a lower layer handover procedure, wherein the lower layer handover procedure comprises one of a layer 1 handover procedure or a layer 2 handover procedure

1705

Output an information element indicating that a second reset procedure for the lower layer handover procedure is enabled or disabled, wherein the second reset procedure indicates a second set of operating parameters for a higher layer than layer 1 and layer 2 in a protocol stack

RECONFIGURATION FOR LOWER LAYER MOBILITY

FIELD OF TECHNOLOGY

The following relates to wireless communication, including reconfiguration for lower layer mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reconfiguration for lower layer (e.g., layer 1 (L1) or layer 2 (L2)) mobility. For example, the described techniques provide for an L1/L2 mobility procedure with a modified upper layer reconfiguration procedure. A user equipment (UE) may receive a first control message indicating a set of mobility parameters for a lower layer handover procedure (e.g., an L1 or L2 handover procedure). In some cases, the UE may receive a second control message indicating a first reset procedure and a second reset procedure indicating respective first and second sets of operating parameters for a higher layer than L1 and L2 in a protocol stack. The UE may perform the lower layer handover procedure based on the set of mobility parameters, and either the first or second set of operating parameters. For example, in performing the handover procedure, the UE may switch from a first serving cell to a second serving cell. Based on whether the first and second serving cells are associated with a same distributed unit (DU), the UE may then perform either the first reset procedure or the second reset procedure. In this way, the UE may communicate with the second serving cell in accordance with the first or second set of operating parameters based on performing the lower layer handover procedure and one of the reset procedures.

A method for wireless communication at a UE is described. The method may include receiving a first control message indicating a set of mobility parameters associated with a lower layer handover procedure, where the lower layer handover procedure includes one of an L1 handover procedure or an L2 handover procedure, receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer, and performing the lower layer handover procedure based on the set of mobility parameters and one of the first reset procedure or the second reset procedure.

An apparatus for wireless communication at a UE is described. The apparatus may include a processor, memory coupled with the processor, and instructions stored in the memory. The instructions may be executable by the processor to cause the apparatus to receive a first control message indicating a set of mobility parameters associated with a lower layer handover procedure, where the lower layer handover procedure includes one of an L1 handover procedure or an L2 handover procedure, receive a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer, and perform the lower layer handover procedure based on the set of mobility parameters and one of the first reset procedure or the second reset procedure.

Another apparatus for wireless communication at a UE is described. The apparatus may include means for receiving a first control message indicating a set of mobility parameters associated with a lower layer handover procedure, where the lower layer handover procedure includes one of an L1 handover procedure or an L2 handover procedure, means for receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer, and means for performing the lower layer handover procedure based on the set of mobility parameters and one of the first reset procedure or the second reset procedure.

A non-transitory computer-readable medium storing code for wireless communication at a UE is described. The code may include instructions executable by a processor to receive a first control message indicating a set of mobility parameters associated with a lower layer handover procedure, where the lower layer handover procedure includes one of an L1 handover procedure or an L2 handover procedure, receive a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer, and perform the lower layer handover procedure based on the set of mobility parameters and one of the first reset procedure or the second reset procedure.

Some examples of the method, apparatuses, and non-transitory computer-readable medium described herein may further include operations, features, means, or instructions for switching from a first serving cell to a second serving cell based on performing the lower layer handover procedure, where the first serving cell and the second serving cell correspond to a same DU, performing the first reset procedure based on switching to the second serving cell, and communicating with the second serving cell in accordance with the first set of operating parameters.

In some examples of the method, apparatuses, and non-transitory computer-readable medium described herein, performing the first reset procedure may include operations, features, means, or instructions for applying the first set of operating parameters to the second serving cell, where the first set of operating parameters were previously applied to the first serving cell.

Some examples of the method, apparatuses, and non-transitory computer-readable medium described herein may further include operations, features, means, or instructions for applying a secondary primary cell (SpCell) configuration to the second serving cell based on switching to the second serving cell.

Some examples of the method, apparatuses, and non-transitory computer-readable medium described herein may further include operations, features, means, or instructions for switching from a first serving cell associated with a first DU to a second serving cell associated with a second DU based on performing the lower layer handover procedure, performing the second reset procedure based on switching to the second serving cell, and communicating with the second serving cell in accordance with the second set of operating parameters.

In some examples of the method, apparatuses, and non-transitory computer-readable medium described herein, performing the second reset procedure may include operations, features, means, or instructions for applying the second set of operating parameters to the second serving cell, where the second set of operating parameters reset the first set of operating parameters previously applied to the first serving cell.

In some examples of the method, apparatuses, and non-transitory computer-readable medium described herein, performing the second reset procedure may include operations, features, means, or instructions for performing a portion of the second reset procedure based on switching to the second serving cell, where the portion of the second reset procedure includes resetting a medium access control (MAC) layer of the protocol stack.

In some examples of the method, apparatuses, and non-transitory computer-readable medium described herein, receiving the second control message may include operations, features, means, or instructions for receiving an information element indicating that the second reset procedure may be enabled or disabled.

In some examples of the method, apparatuses, and non-transitory computer-readable medium described herein, receiving the second control message may include operations, features, means, or instructions for receiving an L1 signal or an L2 signal that enables one of the first reset procedure or the second reset procedure.

Some examples of the method, apparatuses, and non-transitory computer-readable medium described herein may further include operations, features, means, or instructions for performing the first reset procedure or the second reset procedure based at least on part on the set of mobility parameters.

In some examples of the method, apparatuses, and non-transitory computer-readable medium described herein, the set of mobility parameters indicates one or more serving cells of the UE and one or more corresponding DUs.

A method is described. The method may include outputting a first control message indicating a set of mobility parameters associated with a lower layer handover procedure, where the lower layer handover procedure includes one of an L1 handover procedure or an L2 handover procedure and outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

An apparatus is described. The apparatus may include a processor, memory coupled with the processor, and instructions stored in the memory. The instructions may be executable by the processor to cause the apparatus to output a first control message indicating a set of mobility parameters associated with a lower layer handover procedure, where the lower layer handover procedure includes one of an L1 handover procedure or an L2 handover procedure and output a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

Another apparatus is described. The apparatus may include means for outputting a first control message indicating a set of mobility parameters associated with a lower layer handover procedure, where the lower layer handover procedure includes one of an L1 handover procedure or an L2 handover procedure and means for outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

A non-transitory computer-readable medium storing code is described. The code may include instructions executable by a processor to output a first control message indicating a set of mobility parameters associated with a lower layer handover procedure, where the lower layer handover procedure includes one of an L1 handover procedure or an L2 handover procedure and output a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

Some examples of the method, apparatuses, and non-transitory computer-readable medium described herein may further include operations, features, means, or instructions for communicating with a UE via a serving cell in accordance with the first set of operating parameters.

Some examples of the method, apparatuses, and non-transitory computer-readable medium described herein may further include operations, features, means, or instructions for communicating with a UE via a serving cell in accordance with the second set of operating parameters.

In some examples of the method, apparatuses, and non-transitory computer-readable medium described herein, outputting the second control message may include operations, features, means, or instructions for outputting an information element indicating that the second reset procedure may be enabled or disabled.

In some examples of the method, apparatuses, and non-transitory computer-readable medium described herein, outputting the second control message may include operations, features, means, or instructions for outputting the second control message indicating the first reset procedure and the second reset procedure.

In some examples of the method, apparatuses, and non-transitory computer-readable medium described herein, the set of mobility parameters indicates one or more serving cells of a UE and one or more corresponding DUs.

BRIEF DESCRIPTION OF THE DRAWINGS

FIG. 11 shows a block diagram of a communications manager that supports reconfiguration for lower layer mobility in accordance with one or more aspects of the present disclosure.

FIGS. 13 through 17 show flowcharts illustrating methods that support reconfiguration for lower layer mobility in accordance with one or more aspects of the present disclosure.

DETAILED DESCRIPTION

Figure 1:
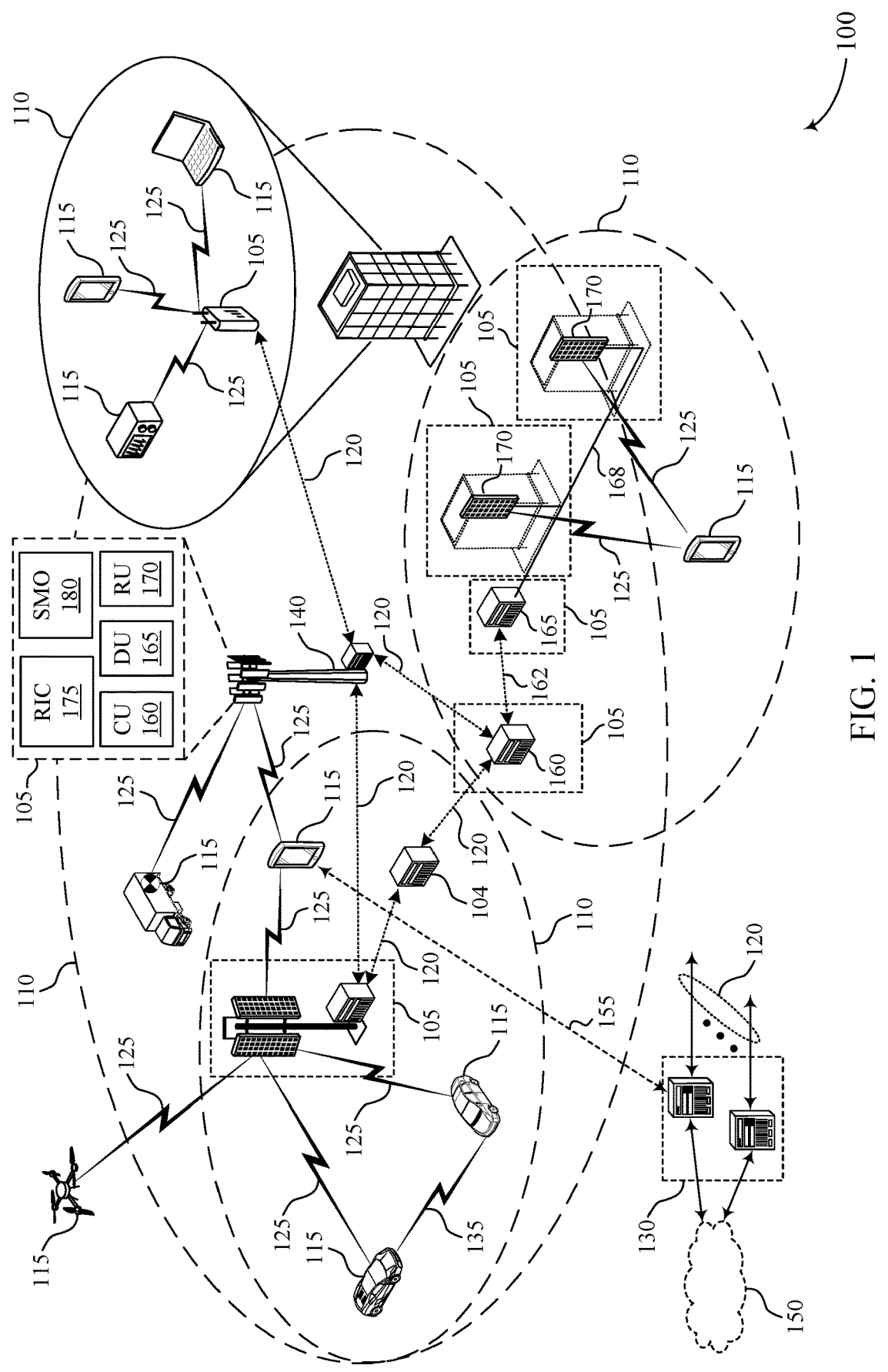
FIG. 1 illustrates an example of a wireless communications system that supports reconfiguration for lower layer mobility in accordance with one or more aspects of the present disclosure.

In a wireless communications system, a central unit (CU) of a network entity (e.g., a base station) may support one or more distributed units (DUs), and each DU may support a set of cells for communications with user equipment (UE). For instance, a UE may receive control signaling that configures a set of cells for lower layer mobility, where the lower layers may include layer 1 (L1) or layer 2 (L2) of a protocol stack. As the UE (e.g., a mobile wireless device) moves through areas supported by the wireless communications system, individual cells from the set of cells may be activated or deactivated by L1/L2 signaling. In this way, the UE may perform handover procedures between different cells. In such an L1/L2 mobility procedure, and as the UE switches between cells, L1/L2 signaling may trigger a secondary cell (SCell) of the UE to switch to a secondary primary cell (SpCell). That is, the SCell may become a primary serving cell of the UE. Switching the SCell to the SpCell may be performed using a radio resource control (RRC) reconfiguration procedure with synchronization, in which the UE may reset an upper layer entity (e.g., a medium access control (MAC) layer or radio link control layer (RLC)) of the SCell. However in some scenarios, such as when the SCell and the SpCell are supported by the same DU (and thus share the same upper layer parameters), the resetting the upper layer parameters may be redundant and such a reconfiguration process may increase latency and increase resource consumption for the L1/L2 mobility procedure.

The techniques described herein support a modified reconfiguration for lower layer mobility. The UE may receive a first control message (e.g., RRC signaling) indicating a set of mobility parameters for a lower layer handover procedure. The lower layer handover procedure may include an L1 handover procedure or an L2 handover procedure. In some cases, the UE may receive a second control message (e.g., the same or different RRC signaling) indicating a first reset procedure and a second reset procedure indicating respective first and second sets of operating parameters for a higher layer in a protocol stack (e.g., a MAC layer, a RLC layer, and any other layer higher than L1 and L2).

The UE may perform the lower layer handover procedure based on the set of mobility parameters, and either the first or second set of operating parameters. For example, in performing the handover procedure, the UE may switch from a first serving cell to a second serving cell. If the first and second serving cells share a same DU, the UE may then perform the first reset procedure and maintain the first set of operating parameters from the first serving cell to the second serving cell. Alternatively, if the first and second serving cells are associated with different DUs, the UE may perform the second reset procedure and reconfigure the second serving cell (e.g., the higher layers in the protocol stack of the second serving cell) with the second set of operating parameters. In this way, the UE may communicate with the second serving cell in accordance with the first or second set of operating parameters based on the lower layer handover procedure. By skipping some or all parts of the upper layer RRC reconfiguration procedure, the UE may reduce interruptions to a user plane, improve quality of service (QoS) and signaling throughput, and decrease latency of the L1/L2 mobility procedure.

Aspects of the disclosure are initially described in the context of wireless communications systems. Aspects of the disclosure are then described in the context of network architectures and process flows. Aspects of the disclosure are further illustrated by and described with reference to apparatus diagrams, system diagrams, and flowcharts that relate to reconfiguration for lower layer mobility.

FIG. 1 illustrates an example of a wireless communications system 100 that supports reconfiguration for lower layer mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a radio unit (RU) 170, a RAN Intelligent Controller (MC) 175 (e.g., a Near-Real Time MC (Near-RT MC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), L2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as L1 (L1) (e.g., physical (PHY) layer) or L2 (e.g., RLC layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child TAB node 104 to receive signaling from a parent TAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through TAB nodes 104, or may directly signal transmissions to a UE 115, or both. The CU 160 of IAB donor may signal communication link establishment via an F1 interface to IAB nodes 104, and the TAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of TAB node 104.

In the case of the techniques described herein applied in the context of a disaggregated RAN architecture, one or more components of the disaggregated RAN architecture may be configured to support reconfiguration for lower layer mobility as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a CA configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a CA configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some wireless communications systems 100, a UE 115 may communicate via one or more lower layers such as L1 and L2. In some cases, the UE 115 may use procedures of L1/L2-based inter-cell mobility to reduce mobility latency. For example, a network entity 105 (e.g., which may include one or more CUs 160, DUs 165, RUs 170, and other components) may configure and maintain multiple candidate cells to enable the UE 115-a to apply configurations for candidate cells more quickly. Additionally, or alternatively, a network entity 105 may configure a dynamic switch mechanism among candidate serving cells (including SpCells and SCells) for potentially applicable scenarios based on L1/L2 signaling.

L1/L2-based inter-cell mobility may be applicable in various scenarios. For example, a UE 115-a may perform such a mobility procedure for standalone, CA, and NR-DC scenarios with a serving cell change within one cell group (CG), intra-DU and intra-CU inter-DU scenarios (e.g., applicable for standalone and CA configurations), intra-frequency and inter-frequency scenarios, frequency range 1 (FR1) and frequency range 2 (FR2) operations, in scenarios where source and target cells are synchronized or unsynchronized, or any combination thereof.

In some cases, during an L1/L2 mobility procedure, the network entity 105 may prepare one or more cells to become a PCell or SpCell using lower layer signaling, which may include L1 signaling and L2 signaling. The L1/L2 mobility procedure may depend on configurations of the one or more cells such that they may become PCells or SpCells. For example, the UE 115 may receive RRC signaling configuring a set of cells for L1/L2 mobility, referred to herein as an L1/L2 mobility-configured cell set. In some cases, an L1/L2 mobility activated cell set may be a group of cells in the configured set that are activated and may readily be used for data and control transfer. An L1/L2 mobility deactivated cell set may be a group of cells in the configured set that are deactivated and may readily be activated by L1/L2 signaling.

The UE 115 may consider various parameters of the wireless communications system 100 when performing an L1/L2 mobility procedure. For example, mobility management of the activated set may be based on L1/L2 signaling used to activate or deactivate cells in the set, and to select beams within the activated cells, which may provide for seamless mobility within the activated cells of the set. As the UE 115-a moves throughout the wireless communications system 100, the cells from the set may be deactivated or activated by L1/L2 signaling. For example, the cells may be deactivated or activated based on signal quality measurements, loading times, or other factors. To sufficiently perform L1/L2 mobility, the cell set may include a quantity of cells that support communications within a given coverage area such that L1/L2 mobility procedures may be performed as a device moves throughout the coverage area.

In some examples of CA, SpCell management may be based on all cells in the wireless communications system 100 that are configured for L1/L2 mobility (e.g., all cells in the L1/L2 configured cell set) having valid SpCell and SCell configurations. In some cases, RRC signaling (e.g., layer 3 (L3) signaling) may update the L1/L2 configured cell set for L1/L2 mobility. The UE 115 may use the L1/L2 signaling to set the SpCell out of the preconfigured options within the activated cell set. The UE 115 may use L1/L2 signaling to switch an SCell to an SpCell instead of using L3 signaling or an RRC reconfiguration with sync, where the UE 115 perform a random access procedure to the targeted new SpCell. For example, if a cell is an SCell and is promoted to become an SpCell, the UE 115 may apply the SpCell configuration. In this way, a previous SpCell may become an SCell to which the UE 115 may apply the SCell configuration.

Using L3 signaling or an RRC reconfiguration with sync may increase latency of an L1/L2 mobility procedure. An RRC reconfiguration with sync may be associated with an information element included in the SpCell configuration (e.g., ReconfigurationWahSync information element included in SpCellConfig), and may list actions the UE 115 performs when the UE 115 receives L3 signaling updating the SpCell. Some of the actions may be based on a reset of a MAC entity for the CG. Alternatively, some of the actions may be based on L3 handover procedures, which include an upper layer reset (including RLC and PDCP layers). However, L1/L2 mobility may not perform such resets, particularly if all of the cells are supported by the MAC entity, the same DU, or both. Even if the DUs are different and the MACs in the DUs are different, the UE 115 may avoid MAC and upper layer resets, which may reduce latency. That is, for L1/L2 mobility, cells may already be configured serving cells whether activated or deactivated. In such cases, the UE 115 may refrain from changing a C-RNTI or any other credentials or parameters, and as such, performing a reconfiguration with sync may be redundant and waste resources.

The wireless communications system 100 may support an L1/L2 mobility procedure with a modified upper layer reconfiguration procedure. A UE 115 may receive a first control message indicating a set of mobility parameters for a lower layer handover procedure (e.g., an L1 or L2 handover procedure). In some cases, the UE 115 may receive a second control message indicating a first reset procedure and a second reset procedure indicating respective first and second sets of operating parameters for a higher layer than L1 and L2 in a protocol stack. The UE 115 may perform the lower layer handover procedure based on the set of mobility parameters, and either the first or second set of operating parameters. For example, in performing the handover procedure, the UE 115 may switch from a first serving cell to a second serving cell. Based on whether the first and second serving cells are associated with a same DU, the UE 115 may then perform either the first reset procedure or the second reset procedure. In this way, the UE 115 may communicate with the second serving cell in accordance with the first or second set of operating parameters based on performing the lower layer handover procedure and one of the reset procedures.

Figure 2:
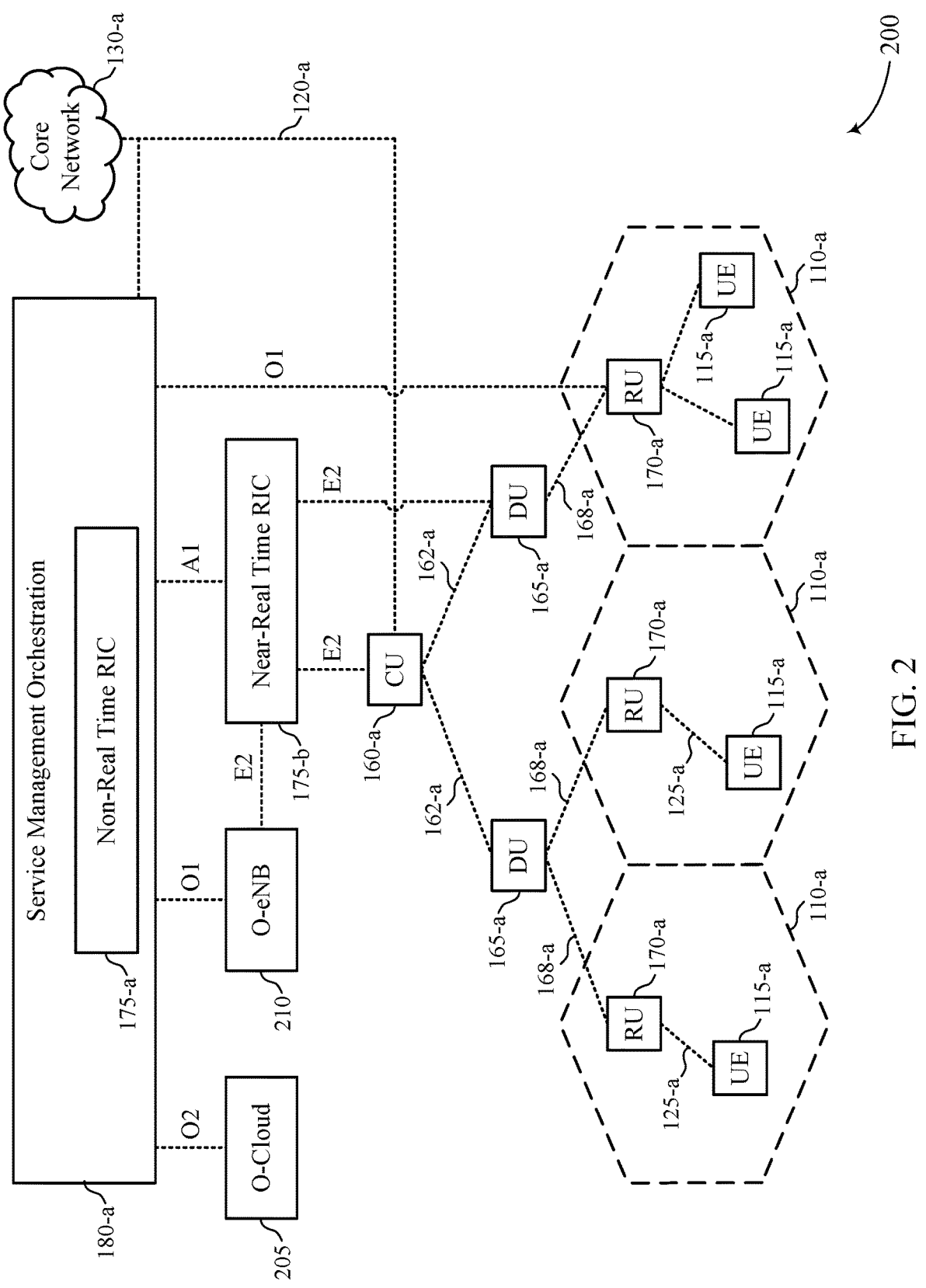
FIG. 2 illustrates an example of a network architecture that supports reconfiguration for lower layer mobility in accordance with one or more aspects of the present disclosure.

FIG. 2 illustrates an example of a network architecture 200 (e.g., a disaggregated base station architecture, a disaggregated RAN architecture) that supports reconfiguration for lower layer mobility in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

The network architecture 200 may support an L1/L2 mobility procedure with a modified upper layer reconfiguration procedure. A UE 115-*a* may receive a first control message (e.g., from a CU 160-*a*, DU 165-*a*, RU 170-*a*) indicating a set of mobility parameters for a lower layer handover procedure (e.g., an L1 or L2 handover procedure). In some cases, the UE 115-*a* may receive (e.g., from a CU 160-*a*, DU 165-*a*, RU 170-*a*) a second control message indicating a first reset procedure and a second reset procedure indicating respective first and second sets of operating parameters for a higher layer than L1 and L2 in a protocol stack. The UE 115-*a* may perform the lower layer handover procedure based on the set of mobility parameters, and either the first or second set of operating parameters. For example, in performing the handover procedure, the UE 115-*a* may switch from a first serving cell to a second serving cell. Based on whether the first and second serving cells are associated with a same DU 165-*a*, the UE 115-*a* may then perform either the first reset procedure or the second reset procedure. In this way, the UE 115-*a* may communicate with the second serving cell in accordance with the first or second set of operating parameters based on performing the lower layer handover procedure and one of the reset procedures.

Figure 3:
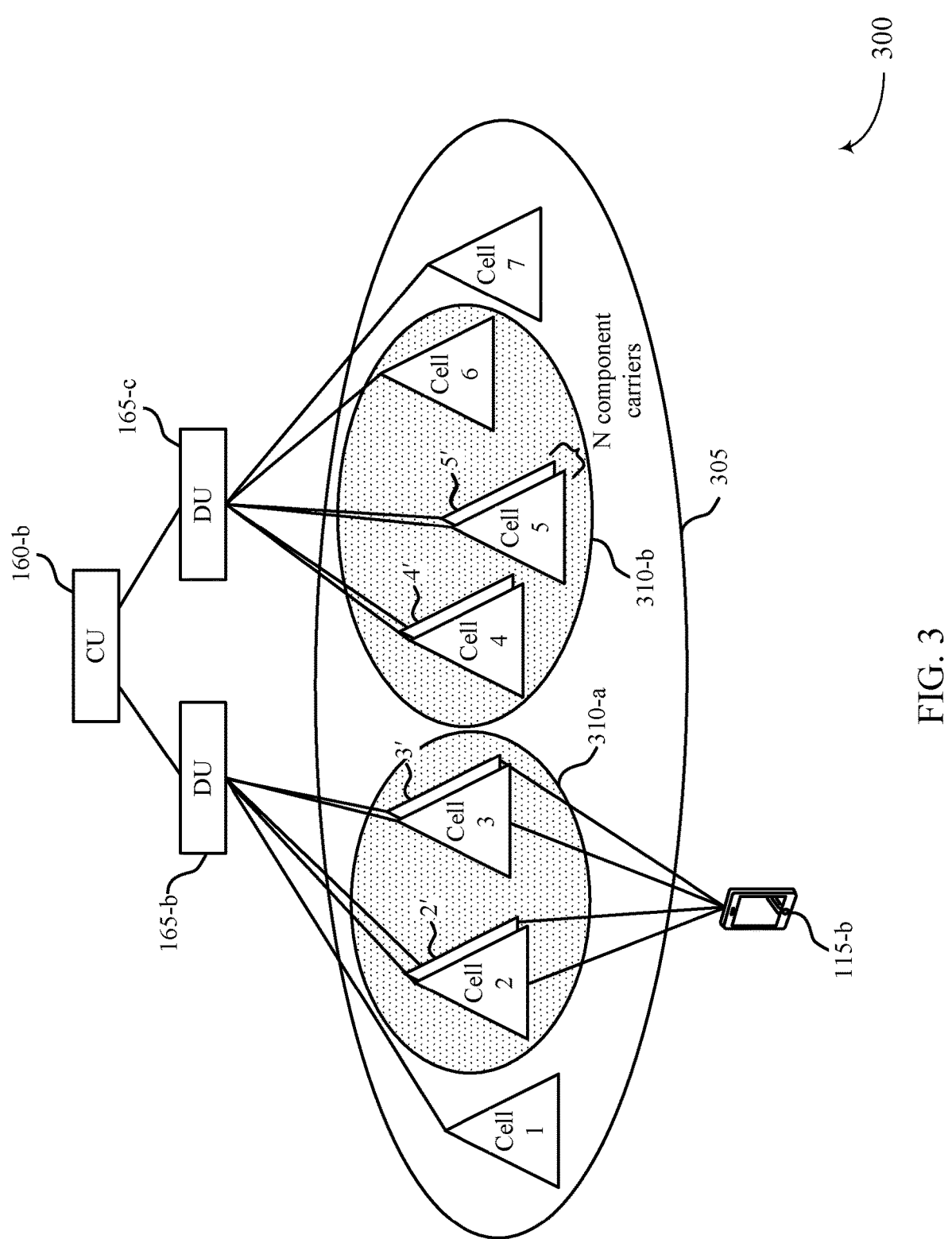
FIG. 3 illustrates an example of a wireless communications system that supports reconfiguration for lower layer mobility in accordance with one or more aspects of the present disclosure.

FIG. 3 illustrates an example of a wireless communications system 300 that supports reconfiguration for lower layer mobility in accordance with one or more aspects of the present disclosure. In some examples, the wireless communications system 300 may implement aspects of the wireless communications system 100 and the network architecture 200 or may be implemented by aspects of the wireless communications system 100 and the network architecture 200. For example, the wireless communications system 300 may include a UE 115-*b*, a CU 160-*b*, a DU 165-*b*, and a DU 165-*c*, which may be examples of corresponding devices described herein. The CU 160-*b* and the DUs 165 may be components of a network entity 105, a base station, or some other network device as described herein. In some examples, the UE 115-*a* may perform a lower layer handover procedure between cells of the wireless communications system 300, where the cells may correspond to the DU 165-*b* or the DU 165-*c*.

The wireless communications system 300 may support communications between the UE 115-*b* and the CU 160-*b*. For example, the CU 160-*b* may output control signaling (e.g., RRC signaling) for reception by the UE 115-*b*. In some examples, the CU 160-*b* may correspond to multiple DUs 165, including the DU 165-*b* and the DU 165-*c*. In addition, each DU 165 may control, operate, or otherwise support one or more cells. For example, the DU 165-*b* (e.g., a first DU) may correspond to a cell 1, a cell 2, and a cell 3, and the DU 165-*c* (e.g., a second DU) may correspond to a cell 4, a cell 5, a cell 6, and a cell 7. In addition, the cell 2 may include a cell 2', the cell 3 may include a cell 3', the cell 4 may include a cell 4', and the cell 5 may include a cell 5', which may represent a CA deployment of respective cells. In some cases, a given set of cells in a CA deployment (e.g., cell 5 and 5') may include a quantity (N) component carriers.

In some cases, the cells (e.g., serving cells), the DUs 165, and the CU 160 may be configured for L1/L2 mobility, such that the UE 115-*b* (a mobile wireless device) may perform handover procedures as the UE 115-*b* moves throughout a coverage area or region supported by the wireless communications system 300. For example, the CU 160-*b* may output RRC signaling to the UE 115-*b* configuring a set of cells for L1/L2 mobility (e.g., the cell 1, the cells 2 and 2', the cells 3 and 3', the cells 4 and 4', the cells 5 and 5', the cell 6, and the cell 7), which may be referred to as an L1/L2 configured cell set 305. In some examples, the wireless communications system 300 may include an activated cell set 310-*a* supported by the DU 165-*a* and an activated cell set 310-*b* supported by the DU 165-*b*. Each activated cell set 310 may include a group of cells that are activated for communication with the UE 115-*b* and managed by L1/L2 signaling. For example, the cells 2, 2', 3, and 3' in the activated cell set 310-*a* may be used for control and data communications between the UE 115-*b* and the CU 160-*b* via the DU 165-*b*, and the cells 4, 4', 5, 5', and 6 in the activated cell set 310-*b* may be used for control and data communications between the UE 115-*b* and the CU 160-*b* via the DU 165-*c*. One of the activated cell set 310-*a* or the activated cell set 310-*b* may be activated at any given time.

In some examples, the UE 115-*b* may use a set of mobility parameters to perform a lower layer (e.g., L1 or L2) handover procedure in the wireless communications system 300. The UE 115-*b* may receive a first control message indicating the set of mobility parameters associated with an L1 or an L2 handover procedure. For example, the first control message may include RRC signaling. That is, the UE 115-*b* may receive an indication of some form of configuration for L1/L2 mobility. In some examples, the set of mobility parameters may indicate one or more serving cells of the UE 115-*b* (e.g., the cell 1 through the cell 7) and one or more corresponding DUs (e.g., the DU 165-*b* and the DU 165-*c*).

In addition, the UE 115-*b* may receive a second control message indicating one of a first reset procedure for the lower layer handover procedure or a second reset procedure for the lower layer handover procedure. In some cases, the second control message may be the same or different RRC signaling as the first control message. The first reset procedure may indicate a first set of operating parameters for a higher layer than L1 or L2 in a protocol stack of a cell, and the second reset procedure may indicate a second set of operating parameters for the higher layer. For example, the higher layer may include a MAC layer, an RLC layer, a PDCP layer, or any other layer of the protocol stack that is higher than L1 or L2. In some examples, the first reset procedure and the second reset procedure may correspond to some form of an RRC reconfiguration procedure with sync, and may reconfigure (e.g., reset) one or more higher layers of a serving cell during an L1/L2 mobility procedure.

The UE 115-*b* may be connected to a serving cell of the activated cell set 310-*a*. For example, the UE 115-*b* may communicate with the cell 2 and the cell 2' in a CA scenario. In some cases, the UE 115-*b* may perform the lower layer handover procedure based on the set of mobility parameters and one of the first reset procedure or the second reset procedure. Based on performing the handover procedure, the UE 115-*b* may switch from a first serving cell to a second serving cell in an intra-DU L1/L2 mobility procedure. For example, the UE 115-*b* may switch from the cell 2 to the cell 3. As the cell 2 and the cell 3 correspond to a same DU 165 (e.g., the DU 165-*b*), and thus the same higher layers, the UE 115-*b* may perform the first reset procedure after switching to the cell 2.

In some examples, the first reset procedure may include applying the first set of operating parameters to the cell 3 (e.g., the second serving cell), where the UE 115-*b* may have previously applied the first set of operating parameters to the first serving cell. That is, based on receiving the second control signaling indicating the first reset procedure, the UE 115-*b* may refrain from performing any MAC reset or other reconfiguration with sync procedures to the higher layers of the protocol stack of the second serving cell. In this way, the UE 115-*b* may communicate with the second serving cell (e.g., the cell 3) in accordance with the first set of operating parameters without resetting the upper layers of the protocol stack. The UE 115-*b* may refrain from applying any RRC reconfiguration with sync procedure to the second serving cell, and may communicate with the second serving cell in accordance with the first set of operating parameters and using the original L1/L2 mobility configuration (e.g., the set of mobility parameters) indicated in the first control message. In some cases, if the second serving cell (e.g., the cell 2) is an SpCell of the UE 115-*b*, the UE 115-*b* may apply an SpCell configuration to the second serving cell based on switching to the second serving cell, still without reconfiguring the higher layers.

Alternatively, the UE 115-*b* may perform the lower layer handover procedure and switch from the first serving cell, the cell 2, to a second serving cell that is in a different activated cell set 310. For example, the UE 115-*b* may switch from the cell 2 of the activated cell set 310-*a* to a cell 4 of the activated cell set 310-*b*, where the cell 2 corresponds to the DU 165-*b* and the cell 4 corresponds to the DU 165-*c*

(e.g., an inter-DU L1/L2 mobility procedure). Based on the first serving cell and the second serving cell corresponding to different DUs 165, and thus different protocol stacks, the UE 115-*b* may perform the second reset procedure after performing the lower layer handover procedure.

In some examples, the second reset procedure may include performing some sort of RRC reconfiguration with sync procedure to one or more higher layers of the protocol stack of the second serving cell (e.g., a soft MAC reset, a skip MAC reset). For example, the UE 115-*b* may perform the RRC reconfiguration with sync procedure for a MAC layer, an RLC layer, a PDCP layer, or any other layer of the protocol stack higher than L1 or L2. In some cases, the RRC reconfiguration with sync procedure may include applying the second set of operating parameters to the second serving cell, where the second set of parameters reset the first set of parameters the UE 115-*b* may have previously applied to the first serving cell. As such, the UE 115-*b* may communicate with the second serving cell in accordance with the second set of operating parameters, which reset the higher layers of the protocol stack based on the second serving cell corresponding to the DU 165-*c*.

The UE 115-*b* may use the described techniques in various scenarios. For example, if the CU 160-*b* updates an existing SCell to a target SpCell, the UE 115-*b* may perform the second reset procedure if the higher layers of the protocol stack change for the SpCell. In some cases, the UE 115-*b* may perform a reset procedure based on the set of mobility parameters, which indicate the set of serving cells and corresponding DUs 165. For example, the UE 115-*b* may apply the first reset procedure for intra-DU L1/L2 mobility, where there may be only one MAC entity (e.g., cases in which the UE 115-*b* switches between serving cells of a same DU 165). Alternatively, the UE 115-*b* may apply the second reset procedure for inter-DU L1/L2 mobility, where there may be multiple MAC entities (e.g., cases in which the UE 115-*b* switches between serving cells of a different DU 165). In some examples, the UE 115-*b* may use such reset procedures when connected to and performing handover procedures between multiple TRPs, or in any other scenario of L1/L2 mobility.

In some cases, the UE 115-*b* may perform a modified (e.g., soft) second reset procedure. For example, the UE 115-*b* may perform a portion of the second reset procedure based on switching to the second serving cell associated with a different DU 165 (e.g., switching to the cell 4 corresponding to the DU 165-*c*), where the portion of the second reset procedure may include resetting a MAC layer of the protocol stack (and maintaining other higher layers). In other cases, the UE 115-*b* may perform a full second reset procedure (e.g., as described herein as inter-DU L1/L2 mobility), or may refrain from performing the second reset procedure and perform the first reset procedure (e.g., as described herein as intra-DU L1/L2 mobility). In some examples, the UE 115-*b* may implicitly determine whether to perform the first reset procedure or the second reset procedure based on the set of mobility parameters (e.g., the L1/L2 mobility configuration). For example, if the set of mobility parameters indicate that the UE 115-*b* is to switch from a first serving cell associated with the DU 165-*b* to a second serving cell also associated with the DU 165-*b*, the UE 115-*b* may determine to use the first reset procedure, and if the set of mobility parameters indicate that the UE 115-*b* is a second serving cell associated with the DU 165-*c*, the UE 115-*b* may determine to use the second reset procedure.

In some examples, the second control message may include an explicit indication that the second reset procedure (e.g., the RRC reconfiguration with sync procedure) is enabled or disabled. For example, the second control message may be an RRC configuration message that includes an information element (e.g., soft/skip MAC reset) that may have an "enabled" or "disabled" value (e.g., ENUMER-ATED {enabled, disabled}). If the information element is enabled, the UE 115-*b* may perform the second reset procedure and apply the second set of operating parameters to reset the second serving cell. If the information element is disabled, the UE 115-*b* may perform the first reset procedure and refrain from resetting the operating parameters of the second serving cell. Alternatively, the UE 115-*b* may receive L1/L2 signaling that explicitly indicates whether the UE 115-*b* is to use the first or second reset procedure. That is, the UE 115-*b* may receive an L1 signal or an L2 signal that enables one of the first reset procedure or the second reset procedure.

By applying the first reset procedure or the second reset procedure following a lower layer handover procedure, as described herein, the UE 115-*b* may support improved communications with the CU 160-*b*. For example, by refraining from resetting higher layer operating parameters if the UE 115-*b* switches to a serving cell of a same DU 165, the UE 115-*b* may reduce interruption to the user plane by skipping some or all parts of a MAC reset procedure. In addition, this may result in improved QoS and increased signaling throughput due to continuous data transmissions and reduced interruptions during lower layer handover procedures. In some cases, the UE 115-*b* may improve latency based on faster SpCell updating (compared to L3 handover with full reconfiguration and sync procedures) because the UE 115-*b* may refrain from resetting an entire protocol stack.

Figure 4:
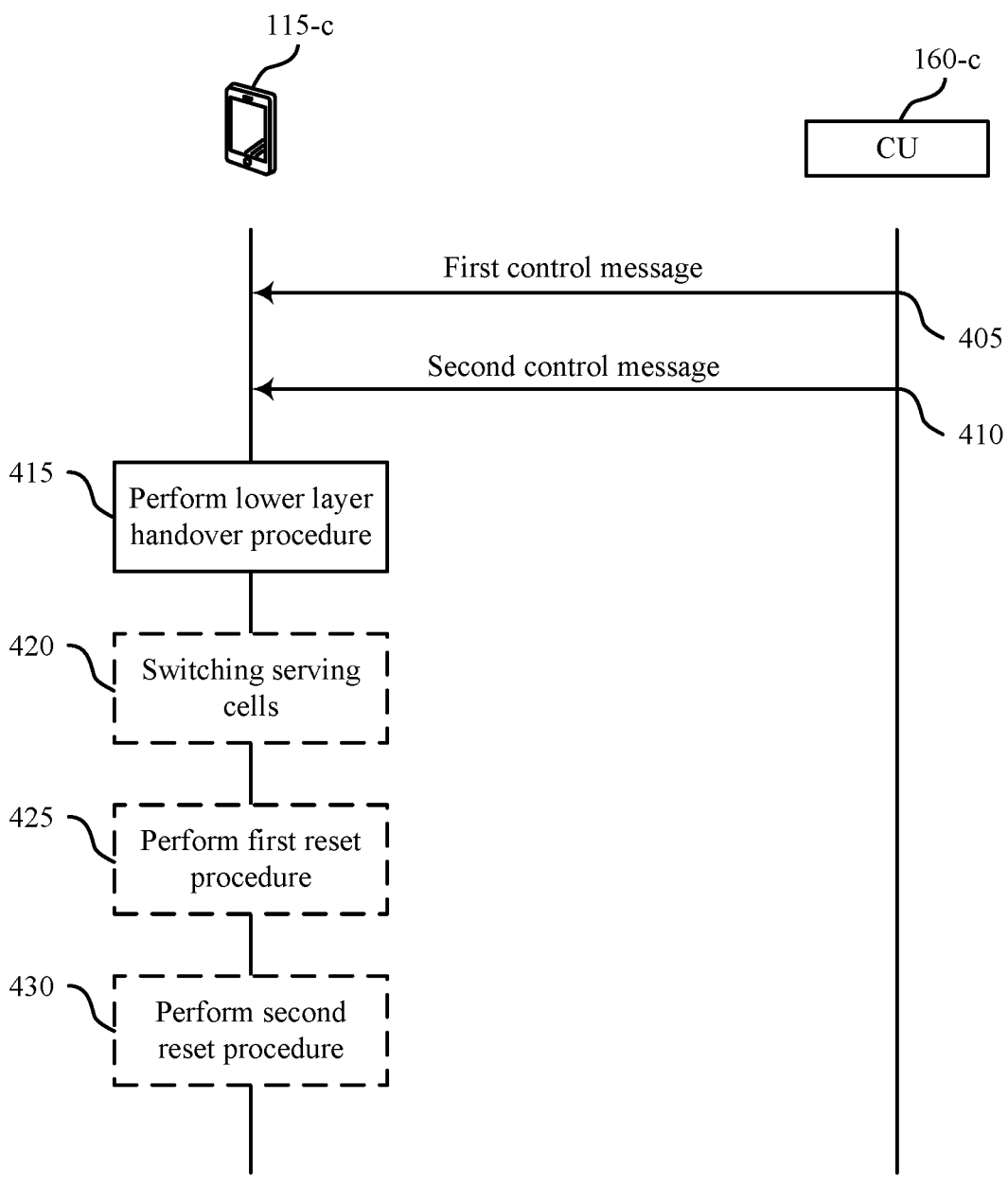
FIG. 4 illustrates an example of a process flow that supports reconfiguration for lower layer mobility in accordance with one or more aspects of the present disclosure.

FIG. 4 illustrates an example of a process flow 400 that supports reconfiguration for lower layer mobility in accordance with one or more aspects of the present disclosure. The process flow 400 may implement aspects of wireless communications system 100 and the network architecture 200, or may be implemented by aspects of the wireless communications system 100 and the network architecture 200. For example, the process flow 400 may illustrate operations between a UE 115-*c* and a CU 160-*c*, which may be examples of corresponding devices described herein. In the following description of the process flow 400, the operations between the UE 115-*c* and the CU 160-*c* may be transmitted in a different order than the example order shown, or the operations performed by the UE 115-*c* and the CU 160-*c* may be performed in different orders or at different times. Some operations may also be omitted from the process flow 400, and other operations may be added to the process flow 400.

At 405, the UE 115-*c* may receive a first control message (e.g., RRC signaling) indicating a set of mobility parameters associated with a lower layer handover procedure, where the lower layer handover procedure may include one of an L1 handover procedure or an L2 handover procedure. The UE 115-*c* may use the set of mobility parameters to handover between serving cells when moving throughout a wireless communications system.

At 410, the UE 115-*c* may receive a second control message (e.g., RRC signaling) indicating one of a first reset procedure for the lower layer handover procedure or a second reset procedure for the lower layer handover procedure, where the first reset procedure indicates a first set of operating parameters for a higher layer than L1 or L2 in a protocol stack, and where the second reset procedure indicates a second set of operating parameters for the higher layer. For example, the higher layer may include a MAC layer, an RLC layer, or any other layer in the protocol stack higher than L1 and L2. In some cases, the first and second control messages may be included in a same or different transmission. In some examples, the second control message may include an information element indicating whether the second reset procedure is enabled or disabled.

At 415, the UE 115-*c* may perform the lower layer handover procedure based on the set of mobility parameters and one of the first reset procedure or the second reset procedure. For example, the UE 115-*c* may handover from a first serving cell to a second serving cell based on moving throughout a wireless communications system.

At 420, the UE 115-*c* may switch from the first serving cell to the second serving cell based on performing the lower layer handover procedure. In some examples, the first and second serving cells may be associated with a same DU, or the first and second serving cells may be associated with different DUs. The second serving cell may become the SpCell of the UE 115-*c* based on the switching.

At 425, based on switching to the second serving cell, which is associated with a same DU as the first serving cell, the UE 115-*c* may perform the first reset procedure. That is, because the first and second serving cells are associated with the same DU and thus, the same protocol stack, the UE 115-*c* may apply the first set of operating parameters to the second serving cell, where the first set of operating parameters were previously applied to the first serving cell (e.g., the UE 115-*c* may maintain the same operating parameters for the upper layers of the protocol stack of the second serving cell). In this way, the UE 115-*c* may communicate with the second serving cell in accordance with the first set of operating parameters.

At 430, based on switching to the second serving cell, which is associated with a different DU as the first serving cell, the UE 115-*c* may perform the second reset procedure. That is, because the first and second serving cells are associated with different DUs and thus, different protocol stacks, the UE 115-*c* may reset the second serving cell with the second set of operating parameters to the serving cell, where the first set of operating parameters were previously applied to the first serving cell (e.g., the UE 115-*c* may reset the second serving cell with different operating parameters). In this way, the UE 115-*c* may communicate with the second serving cell in accordance with the second set of operating parameters.

Figure 5:
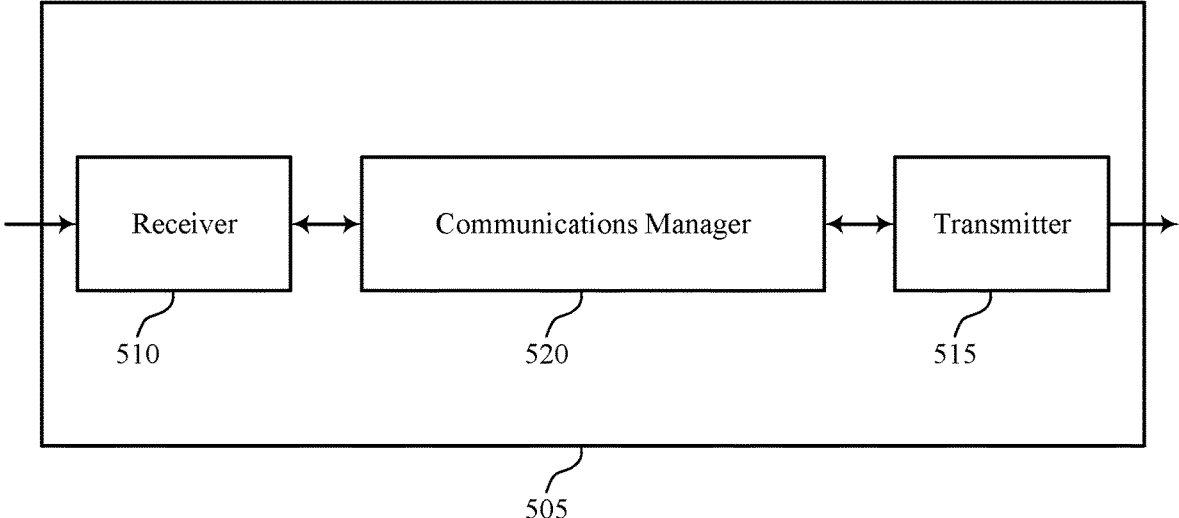
FIGS. 5 and 6 show block diagrams of devices that support reconfiguration with sync procedure for L1/L2 2 mobility in accordance with one or more aspects of the present disclosure.

FIG. 5 shows a block diagram 500 of a device 505 that supports reconfiguration for lower layer mobility in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reconfiguration for lower layer mobility). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reconfiguration for lower layer mobility). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reconfiguration for lower layer mobility as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a first control message indicating a set of mobility parameters associated with a lower layer handover procedure, where the lower layer handover procedure includes one of an L1 handover procedure or an L2 handover procedure. The communications manager 520 may be configured as or otherwise support a means for receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The communications manager 520 may be configured as or otherwise support a means for performing the lower layer handover procedure based on the set of mobility parameters and one of the first reset procedure or the second reset procedure.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for a modified higher layer reconfiguration procedure for L1/L2 mobility, which may improve QoS, increase signaling throughput, reduce interrupts to the user plane, and reduce latency.

Figure 6:
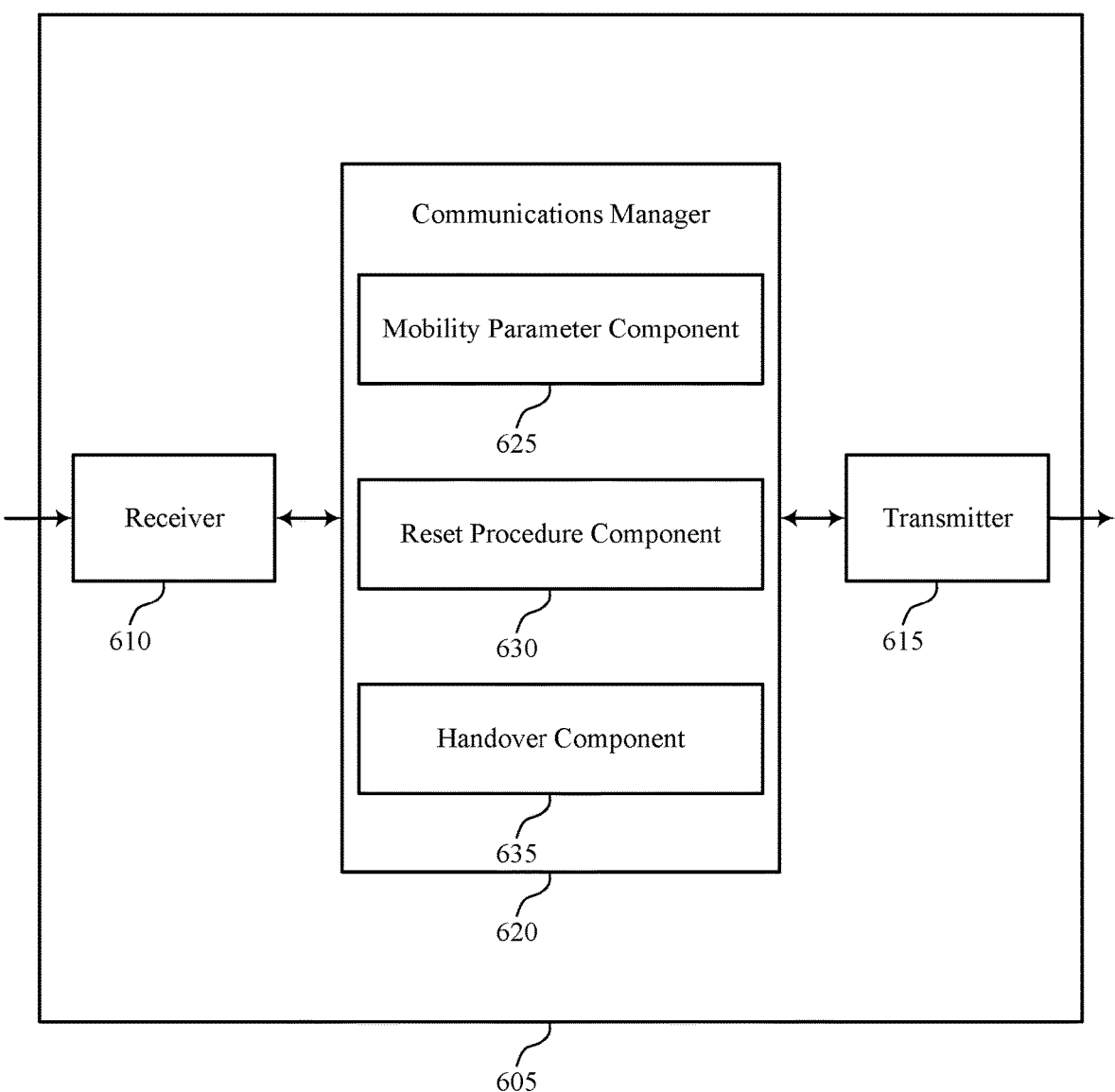

FIG. 6 shows a block diagram 600 of a device 605 that supports reconfiguration for lower layer mobility in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reconfiguration for lower layer mobility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reconfiguration for lower layer mobility). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reconfiguration for lower layer mobility as described herein. For example, the communications manager 620 may include a mobility parameter component 625, a reset procedure component 630, a handover component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The mobility parameter component 625 may be configured as or otherwise support a means for receiving a first control message indicating a set of mobility parameters associated with a lower layer handover procedure, where the lower layer handover procedure includes one of an L1 handover procedure or an L2 handover procedure. The reset procedure component 630 may be configured as or otherwise support a means for receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The handover component 635 may be configured as or otherwise support a means for performing the lower layer handover procedure based on the set of mobility parameters and one of the first reset procedure or the second reset procedure.

Figure 7:
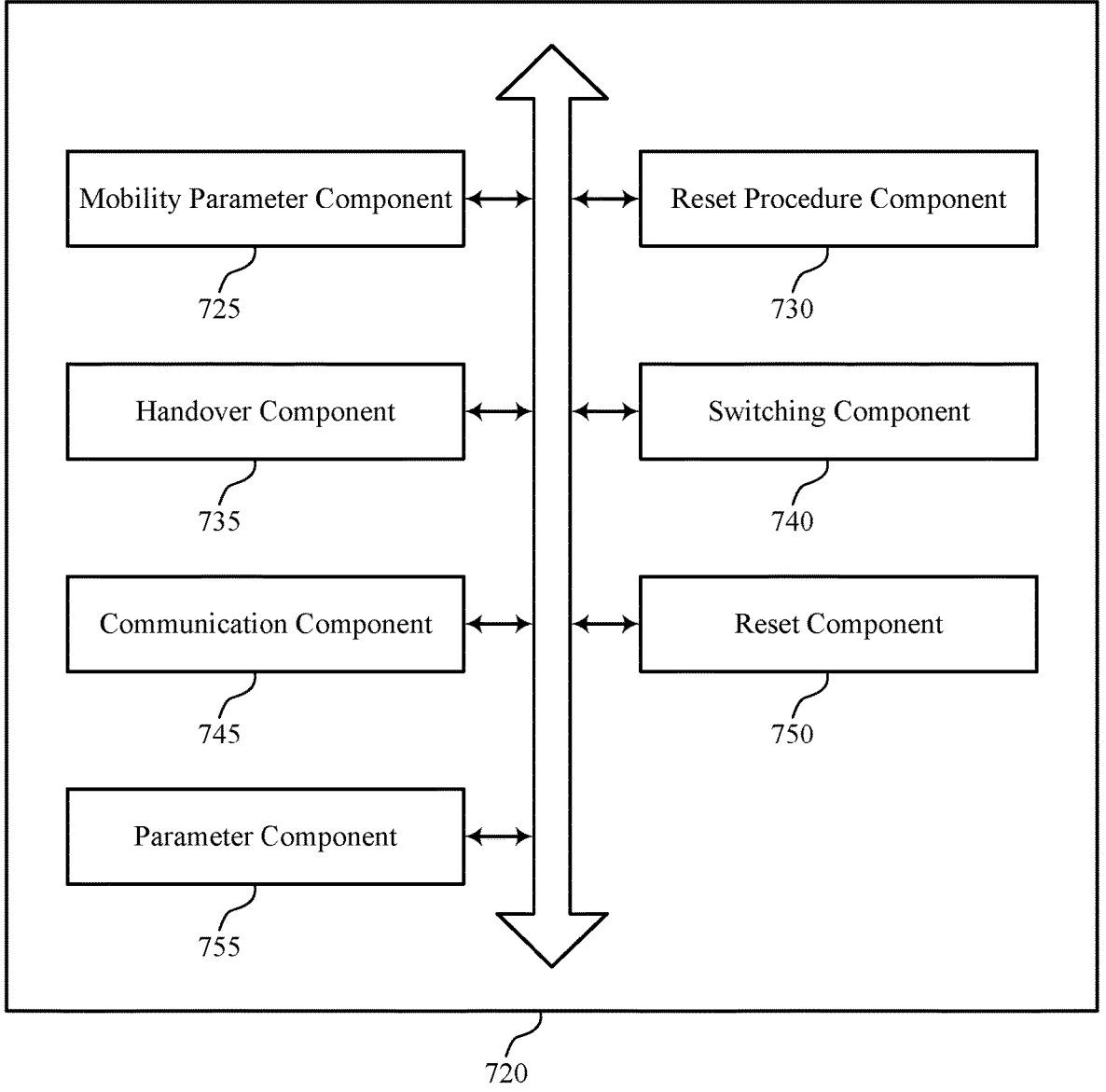
FIG. 7 shows a block diagram of a communications manager that supports reconfiguration for lower layer mobility in accordance with one or more aspects of the present disclosure.

FIG. 7 shows a block diagram 700 of a communications manager 720 that supports reconfiguration for lower layer mobility in accordance with one or more aspects of the present disclosure. The communications manager 720 may be an example of aspects of a communications manager 520, a communications manager 620, or both, as described herein. The communications manager 720, or various components thereof, may be an example of means for performing various aspects of reconfiguration for lower layer mobility as described herein. For example, the communications manager 720 may include a mobility parameter component 725, a reset procedure component 730, a handover component 735, a switching component 740, a communication component 745, a reset component 750, a parameter component 755, or any combination thereof. Each of these components may communicate, directly or indirectly, with one another (e.g., via one or more buses).

The communications manager 720 may support wireless communication at a UE in accordance with examples as disclosed herein. The mobility parameter component 725 may be configured as or otherwise support a means for receiving a first control message indicating a set of mobility parameters associated with a lower layer handover procedure, where the lower layer handover procedure includes one of an L1 handover procedure or an L2 handover procedure. The reset procedure component 730 may be configured as or otherwise support a means for receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The handover component 735 may be configured as or otherwise support a means for performing the lower layer handover procedure based on the set of mobility parameters and one of the first reset procedure or the second reset procedure.

In some examples, the switching component 740 may be configured as or otherwise support a means for switching from a first serving cell to a second serving cell based on performing the lower layer handover procedure, where the first serving cell and the second serving cell correspond to a same DU. In some examples, the reset procedure component 730 may be configured as or otherwise support a means for performing the first reset procedure based on switching to the second serving cell. In some examples, the communication component 745 may be configured as or otherwise support a means for communicating with the second serving cell in accordance with the first set of operating parameters.

In some examples, to support performing the first reset procedure, the parameter component 755 may be configured as or otherwise support a means for applying the first set of operating parameters to the second serving cell, where the first set of operating parameters were previously applied to the first serving cell.

In some examples, the parameter component 755 may be configured as or otherwise support a means for applying an SpCell configuration to the second serving cell based on switching to the second serving cell.

In some examples, the switching component 740 may be configured as or otherwise support a means for switching from a first serving cell associated with a first DU to a second serving cell associated with a second DU based on performing the lower layer handover procedure. In some examples, the reset procedure component 730 may be configured as or otherwise support a means for performing the second reset procedure based on switching to the second serving cell. In some examples, the communication component 745 may be configured as or otherwise support a means for communicating with the second serving cell in accordance with the second set of operating parameters.

In some examples, to support performing the second reset procedure, the parameter component 755 may be configured as or otherwise support a means for applying the second set of operating parameters to the second serving cell, where the second set of operating parameters reset the first set of operating parameters previously applied to the first serving cell.

In some examples, to support performing the second reset procedure, the reset procedure component 730 may be configured as or otherwise support a means for performing a portion of the second reset procedure based on switching to the second serving cell, where the portion of the second reset procedure includes resetting a MAC layer of the protocol stack.

In some examples, to support receiving the second control message, the reset procedure component 730 may be configured as or otherwise support a means for receiving an information element indicating that the second reset procedure is enabled or disabled.

In some examples, to support receiving the second control message, the reset procedure component 730 may be configured as or otherwise support a means for receiving an L1 signal or an L2 signal that enables one of the first reset procedure or the second reset procedure.

In some examples, the reset component 750 may be configured as or otherwise support a means for performing the first reset procedure or the second reset procedure based at least on part on the set of mobility parameters. In some examples, the set of mobility parameters indicates one or more serving cells of the UE and one or more corresponding DUs.

Figure 8:
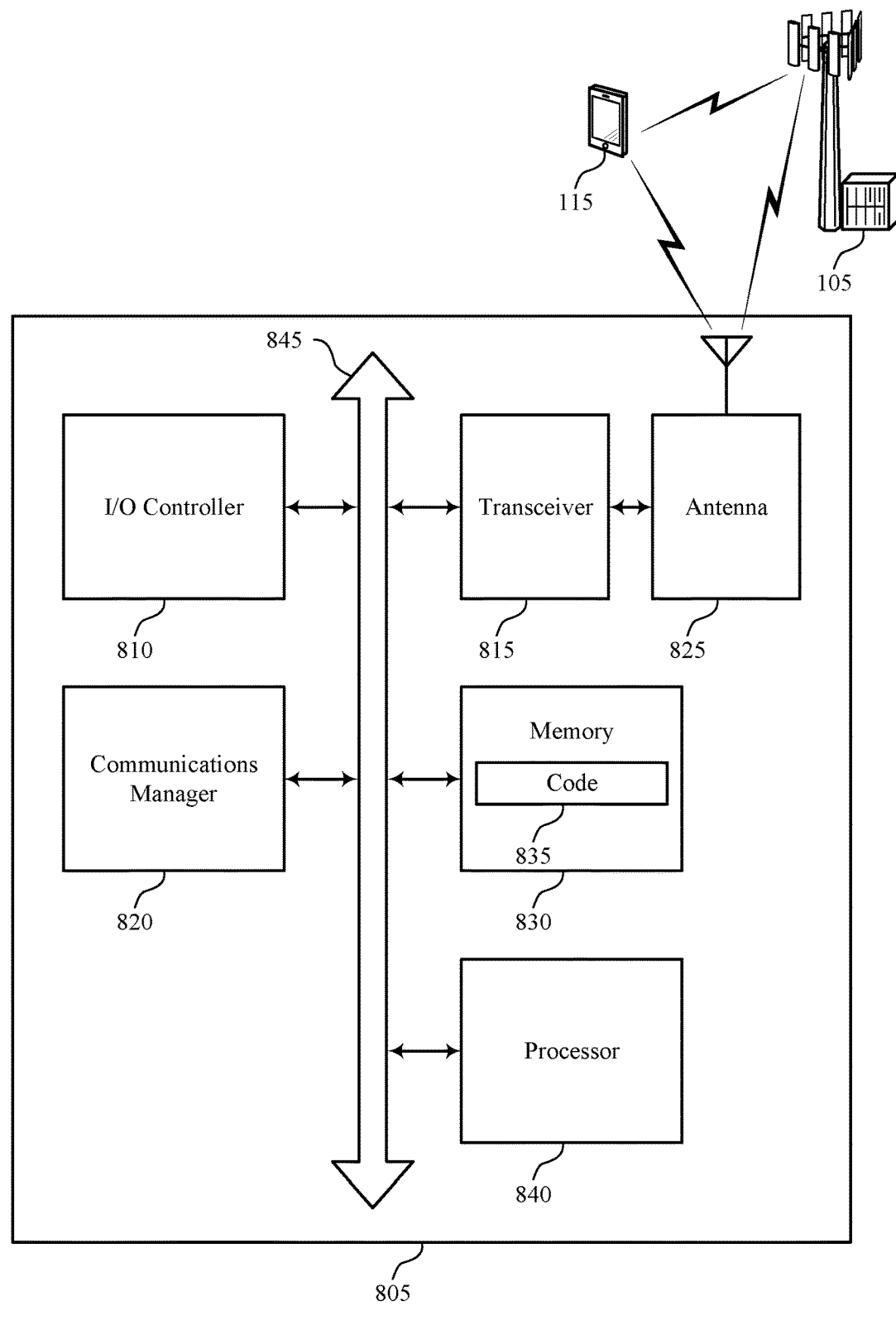
FIG. 8 shows a diagram of a system including a device that supports reconfiguration for lower layer mobility in accordance with one or more aspects of the present disclosure.

FIG. 8 shows a diagram of a system 800 including a device 805 that supports reconfiguration for lower layer mobility in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reconfiguration for lower layer mobility). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first control message indicating a set of mobility parameters associated with a lower layer handover procedure, where the lower layer handover procedure includes one of an L1 handover procedure or an L2 handover procedure. The communications manager 820 may be configured as or otherwise support a means for receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The communications manager 820 may be configured as or otherwise support a means for performing the lower layer handover procedure based on the set of mobility parameters and one of the first reset procedure or the second reset procedure.

By including or configuring the communications manager 820 in accordance with examples as described herein, the device 805 may support techniques for a modified higher layer reconfiguration procedure for L1/L2 mobility, which may improve QoS, increase signaling throughput, reduce interrupts to the user plane, and reduce latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reconfiguration for lower layer mobility as described herein, or the processor 840 and the memory 830 may be otherwise configured to perform or support such operations.

Figure 9:
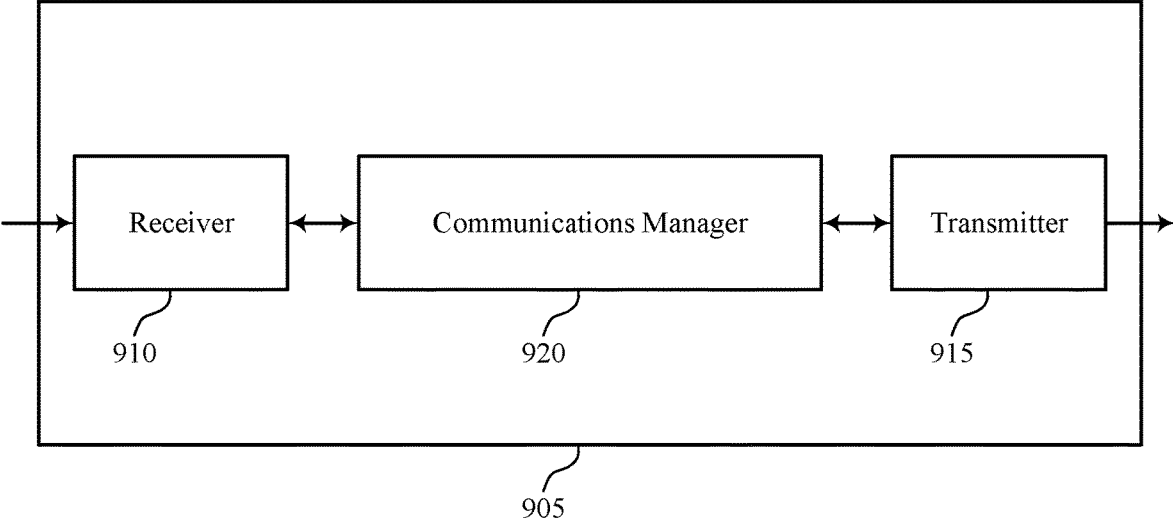
FIGS. 9 and 10 show block diagrams of devices that support reconfiguration for lower layer mobility in accordance with one or more aspects of the present disclosure.

FIG. 9 shows a block diagram 900 of a device 905 that supports reconfiguration for lower layer mobility in accordance with one or more aspects of the present disclosure. The device 905 may be an example of aspects of a CU as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reconfiguration for lower layer mobility as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

For example, the communications manager 920 may be configured as or otherwise support a means for outputting a first control message indicating a set of mobility parameters associated with a lower layer handover procedure, where the lower layer handover procedure includes one of an L1 handover procedure or an L2 handover procedure. The communications manager 920 may be configured as or otherwise support a means for outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for a modified higher layer reconfiguration procedure for L1/L2 mobility, which may improve QoS, increase signaling throughput, reduce interrupts to the user plane, and reduce latency.

Figure 10:
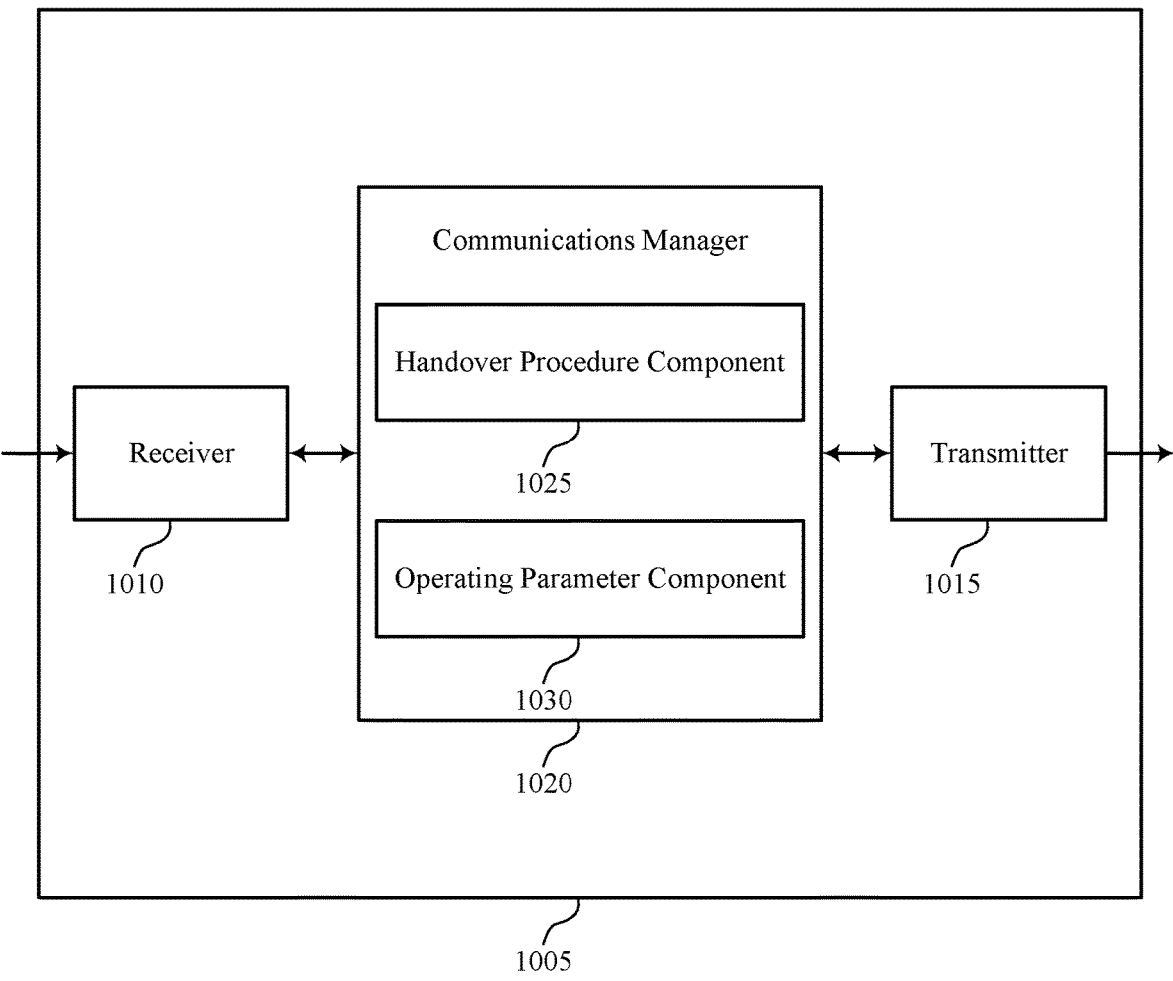

FIG. 10 shows a block diagram 1000 of a device 1005 that supports reconfiguration for lower layer mobility in accordance with one or more aspects of the present disclosure. The device 1005 may be an example of aspects of a device 905 or a CU 160 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reconfiguration for lower layer mobility as described herein.

For example, the communications manager 1020 may include a handover procedure component 1025 an operating parameter component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The handover procedure component 1025 may be configured as or otherwise support a means for outputting a first control message indicating a set of mobility parameters associated with a lower layer handover procedure, where the lower layer handover procedure includes one of an L1 handover procedure or an L2 handover procedure. The operating parameter component 1030 may be configured as or otherwise support a means for outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

FIG. 11 shows a block diagram 1100 of a communications manager 1120 that supports reconfiguration for lower layer mobility in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reconfiguration for lower layer mobility as described herein. For example, the communications manager 1120 may include a handover procedure component 1125, an operating parameter component 1130, a serving cell component 1135, an information element component 1140, or any combination thereof. Each of these components may communicate, directly or indirectly, with one another (e.g., via one or more buses).

The handover procedure component 1125 may be configured as or otherwise support a means for outputting a first control message indicating a set of mobility parameters associated with a lower layer handover procedure, where the lower layer handover procedure includes one of an L1 handover procedure or an L2 handover procedure. The operating parameter component 1130 may be configured as or otherwise support a means for outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

In some examples, the serving cell component 1135 may be configured as or otherwise support a means for communicating with a UE via a serving cell in accordance with the first set of operating parameters.

In some examples, the serving cell component 1135 may be configured as or otherwise support a means for communicating with a UE via a serving cell in accordance with the second set of operating parameters.

In some examples, to support outputting the second control message, the information element component 1140 may be configured as or otherwise support a means for outputting an information element indicating that the second reset procedure is enabled or disabled.

In some examples, to support outputting the second control message, the operating parameter component 1130 may be configured as or otherwise support a means for outputting the second control message indicating the first reset procedure and the second reset procedure. In some examples, the set of mobility parameters indicates one or more serving cells of a UE and one or more corresponding DUs.

Figure 12:
FIG. 12 shows a diagram of a system including a device that supports reconfiguration for lower layer mobility in accordance with one or more aspects of the present disclosure.

FIG. 12 shows a diagram of a system 1200 including a device 1205 that supports reconfiguration for lower layer mobility in accordance with one or more aspects of the present disclosure. The device 1205 may be an example of or include the components of a device 905, a device 1005, or a CU as described herein. The device 1205 may include components for bi-directional voice and data communications including components for transmitting and receiving communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting reconfiguration for lower layer mobility). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

For example, the communications manager 1220 may be configured as or otherwise support a means for outputting a first control message indicating a set of mobility parameters associated with a lower layer handover procedure, where the lower layer handover procedure includes one of an L1 handover procedure or an L2 handover procedure. The communications manager 1220 may be configured as or otherwise support a means for outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer.

By including or configuring the communications manager 1220 in accordance with examples as described herein, the device 1205 may support techniques for a modified higher layer reconfiguration procedure for L1/L2 mobility, which may improve QoS, increase signaling throughput, reduce interrupts to the user plane, and reduce latency.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of reconfiguration for lower layer mobility as described herein, or the processor 1235 and the memory 1225 may be otherwise configured to perform or support such operations.

FIG. 13 shows a flowchart illustrating a method 1300 that supports reconfiguration for lower layer mobility in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first control message indicating a set of mobility parameters associated with a lower layer handover procedure, where the lower layer handover procedure includes one of an L1 handover procedure or an L2 handover procedure. The operations of 1305 may be performed in accordance with examples as disclosed herein. In some examples, aspects of the operations of 1305 may be performed by a mobility parameter component 725 as described with reference to FIG. 7.

At 1310, the method may include receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The operations of 1310 may be performed in accordance with examples as disclosed herein. In some examples, aspects of the operations of 1310 may be performed by a reset procedure component 730 as described with reference to FIG. 7.

At 1315, the method may include performing the lower layer handover procedure based on the set of mobility parameters and one of the first reset procedure or the second reset procedure. The operations of 1315 may be performed in accordance with examples as disclosed herein. In some examples, aspects of the operations of 1315 may be performed by a handover component 735 as described with reference to FIG. 7.

Figure 14:
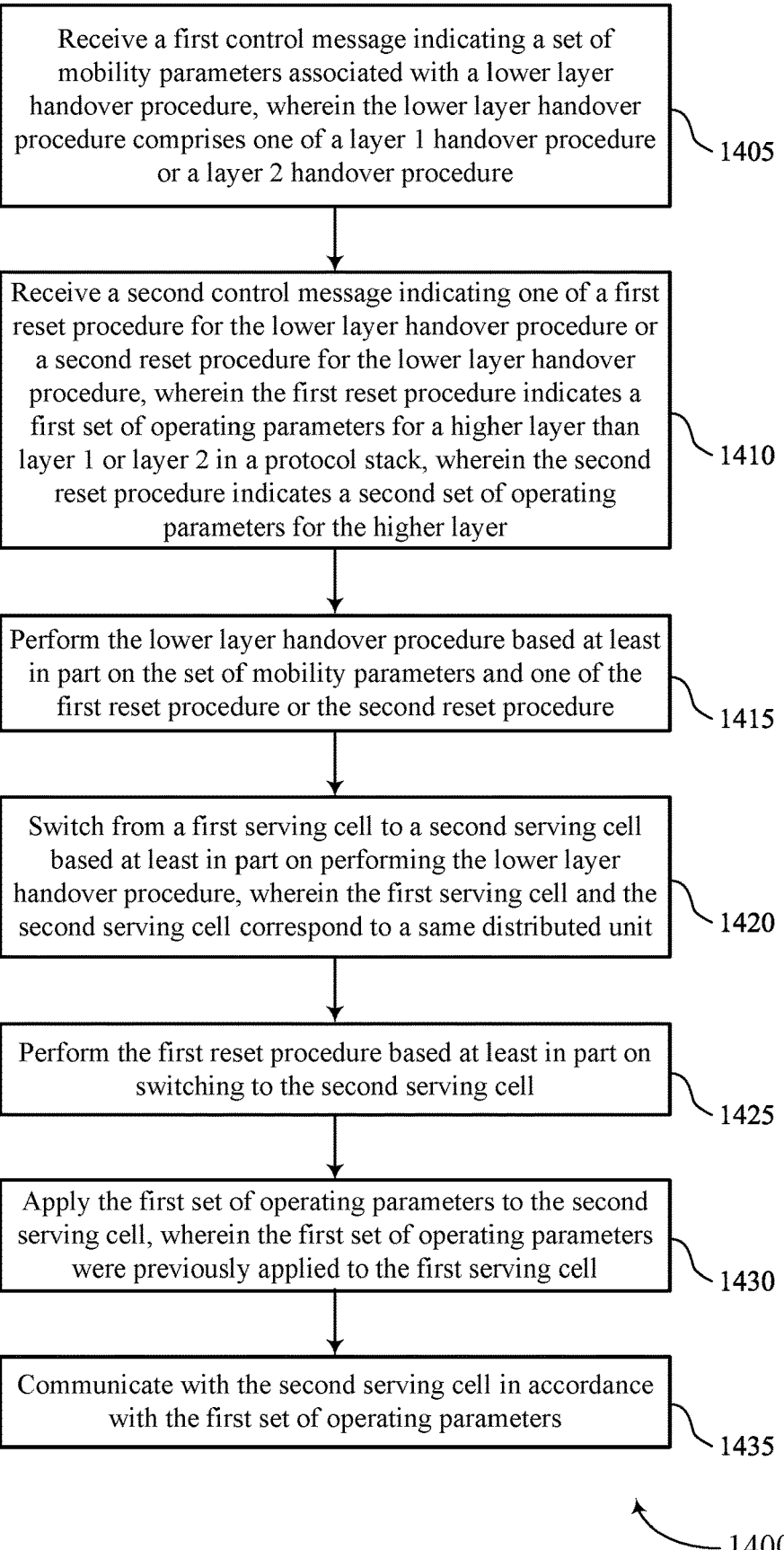

FIG. 14 shows a flowchart illustrating a method 1400 that supports reconfiguration for lower layer mobility in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first control message indicating a set of mobility parameters associated with a lower layer handover procedure, where the lower layer handover procedure includes one of an L1 handover procedure or an L2 handover procedure. The operations of 1405 may be performed in accordance with examples as disclosed herein. In some examples, aspects of the operations of 1405 may be performed by a mobility parameter component 725 as described with reference to FIG. 7.

At 1410, the method may include receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The operations of 1410 may be performed in accordance with examples as disclosed herein. In some examples, aspects of the operations of 1410 may be performed by a reset procedure component 730 as described with reference to FIG. 7.

At 1415, the method may include performing the lower layer handover procedure based on the set of mobility parameters and one of the first reset procedure or the second reset procedure. The operations of 1415 may be performed in accordance with examples as disclosed herein. In some examples, aspects of the operations of 1415 may be performed by a handover component 735 as described with reference to FIG. 7.

At 1420, the method may include switching from a first serving cell to a second serving cell based on performing the lower layer handover procedure, where the first serving cell and the second serving cell correspond to a same DU. The operations of 1420 may be performed in accordance with examples as disclosed herein. In some examples, aspects of the operations of 1420 may be performed by a switching component 740 as described with reference to FIG. 7.

At 1425, the method may include performing the first reset procedure based on switching to the second serving cell. The operations of 1425 may be performed in accordance with examples as disclosed herein. In some examples, aspects of the operations of 1425 may be performed by a reset procedure component 730 as described with reference to FIG. 7.

At 1430, the method may include applying the first set of operating parameters to the second serving cell, where the first set of operating parameters were previously applied to the first serving cell. The operations of 1430 may be performed in accordance with examples as disclosed herein. In some examples, aspects of the operations of 1430 may be performed by a parameter component 755 as described with reference to FIG. 7.

At 1435, the method may include communicating with the second serving cell in accordance with the first set of operating parameters. The operations of 1435 may be performed in accordance with examples as disclosed herein. In some examples, aspects of the operations of 1435 may be performed by a communication component 745 as described with reference to FIG. 7.

FIG. 15 shows a flowchart illustrating a method 1500 that supports reconfiguration for lower layer mobility in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first control message indicating a set of mobility parameters associated with a lower layer handover procedure, where the lower layer handover procedure includes one of an L1 handover procedure or an L2 handover procedure. The operations of 1505 may be performed in accordance with examples as disclosed herein. In some examples, aspects of the operations of 1505 may be performed by a mobility parameter component 725 as described with reference to FIG. 7.

At 1510, the method may include receiving a second control message indicating one of a first reset procedure for the lower layer handover procedure or a second reset procedure for the lower layer handover procedure, where the first reset procedure indicates a first set of operating parameters for a higher layer than L1 or L2 in a protocol stack, where the second reset procedure indicates a second set of operating parameters for the higher layer. The operations of 1510 may be performed in accordance with examples as disclosed herein. In some examples, aspects of the operations of 1510 may be performed by a reset procedure component 730 as described with reference to FIG. 7.

At 1515, the method may include performing the lower layer handover procedure based on the set of mobility parameters and one of the first reset procedure or the second reset procedure. The operations of 1515 may be performed in accordance with examples as disclosed herein. In some examples, aspects of the operations of 1515 may be performed by a handover component 735 as described with reference to FIG. 7.

At 1520, the method may include switching from a first serving cell associated with a first DU to a second serving cell associated with a second DU based on performing the lower layer handover procedure. The operations of 1520 may be performed in accordance with examples as disclosed herein. In some examples, aspects of the operations of 1520 may be performed by a switching component 740 as described with reference to FIG. 7.

At 1525, the method may include performing the second reset procedure based on switching to the second serving cell. The operations of 1525 may be performed in accordance with examples as disclosed herein. In some examples, aspects of the operations of 1525 may be performed by a reset procedure component 730 as described with reference to FIG. 7.

At 1530, the method may include applying the second set of operating parameters to the second serving cell, where the second set of operating parameters reset the first set of operating parameters previously applied to the first serving cell. The operations of 1530 may be performed in accordance with examples as disclosed herein. In some examples, aspects of the operations of 1530 may be performed by a parameter component 755 as described with reference to FIG. 7.

At 1535, the method may include communicating with the second serving cell in accordance with the second set of operating parameters. The operations of 1535 may be performed in accordance with examples as disclosed herein. In some examples, aspects of the operations of 1535 may be performed by a communication component 745 as described with reference to FIG. 7.

FIG. 16 shows a flowchart illustrating a method 1600 that supports reconfiguration for lower layer mobility in accordance with one or more aspects of the present disclosure. The operations of the method 1600 may be implemented by a CU or its components as described herein. For example, the operations of the method 1600 may be performed by a CU as described with reference to FIGS. 1 through 4 and 9 through 12. In some examples, a CU may execute a set of instructions to control the functional elements of the CU to perform the described functions. Additionally, or alternatively, the CU may perform aspects of the described functions using special-purpose hardware.

At 1605, the method may include outputting a first control message indicating a set of mobility parameters associated with a lower layer handover procedure, where the lower layer handover procedure includes one of an L1 handover procedure or an L2 handover procedure. The operations of 1605 may be performed in accordance with examples as disclosed herein. In some examples, aspects of the operations of 1605 may be performed by a handover procedure component 1125 as described with reference to FIG. 11.

At 1610, the method may include outputting a second control message indicating one of a first reset procedure for the lower layer handover procedure or a second reset procedure for the lower layer handover procedure, where the first reset procedure indicates a first set of operating parameters for a higher layer than L1 and L2 in a protocol stack, and where the second reset procedure indicates a second set of operating parameters for the higher layer. The operations of 1610 may be performed in accordance with examples as disclosed herein. In some examples, aspects of the operations of 1610 may be performed by an operating parameter component 1130 as described with reference to FIG. 11.

FIG. 17 shows a flowchart illustrating a method 1700 that supports reconfiguration for lower layer mobility in accordance with one or more aspects of the present disclosure. The operations of the method 1700 may be implemented by a CU or its components as described herein. For example, the operations of the method 1700 may be performed by a CU as described with reference to FIGS. 1 through 4 and 9 through 12. In some examples, a CU may execute a set of instructions to control the functional elements of the CU to perform the described functions. Additionally, or alternatively, the CU may perform aspects of the described functions using special-purpose hardware.

At 1705, the method may include outputting a first control message indicating a set of mobility parameters associated with a lower layer handover procedure, where the lower layer handover procedure includes one of an L1 handover procedure or an L2 handover procedure. The operations of 1705 may be performed in accordance with examples as disclosed herein. In some examples, aspects of the operations of 1705 may be performed by a handover procedure component 1125 as described with reference to FIG. 11.

At 1710, the method may include outputting an information element indicating that a second reset procedure for the lower layer handover procedure is enabled or disabled, wherein the second reset procedure indicates a second set of operating parameters for a higher layer than L1 and L2 in a protocol stack. The operations of 1710 may be performed in accordance with examples as disclosed herein. In some examples, aspects of the operations of 1710 may be performed by an information element component 1140 as described with reference to FIG. 11.

The following provides an overview of aspects of the present disclosure:

Aspect 1: A method for wireless communication at a UE, comprising: receiving a first control message indicating a set of mobility parameters associated with a lower layer handover procedure, wherein the lower layer handover procedure comprises one of an L1 handover procedure or an L2 handover procedure; receiving a second control message indicating one of a first reset procedure for the lower layer handover procedure or a second reset procedure for the lower layer handover procedure, wherein the first reset procedure indicates a first set of operating parameters for a higher layer than L1 or L2 in a protocol stack, wherein the second reset procedure indicates a second set of operating parameters for the higher layer; and performing the lower layer handover procedure based at least in part on the set of mobility parameters and one of the first reset procedure or the second reset procedure.

Aspect 2: The method of aspect 1, further comprising: switching from a first serving cell to a second serving cell based at least in part on performing the lower layer handover procedure, wherein the first serving cell and the second serving cell correspond to a same DU; performing the first reset procedure based at least in part on switching to the second serving cell; and communicating with the second serving cell in accordance with the first set of operating parameters.

Aspect 3: The method of aspect 2, wherein performing the first reset procedure comprises: applying the first set of operating parameters to the second serving cell, wherein the first set of operating parameters were previously applied to the first serving cell.

Aspect 4: The method of any of aspects 2 through 3, further comprising: applying a SpCell configuration to the second serving cell based at least in part on switching to the second serving cell.

Aspect 5: The method of any of aspects 1 through 4, further comprising: switching from a first serving cell associated with a first DU to a second serving cell associated with a second DU based at least in part on performing the lower layer handover procedure; performing the second reset procedure based at least in part on switching to the second serving cell; and communicating with the second serving cell in accordance with the second set of operating parameters.

Aspect 6: The method of aspect 5, wherein performing the second reset procedure comprises: applying the second set of operating parameters to the second serving cell, wherein the second set of operating parameters reset the first set of operating parameters previously applied to the first serving cell.

Aspect 7: The method of any of aspects 5 through 6, wherein performing the second reset procedure comprises: performing a portion of the second reset procedure based at least in part on switching to the second serving cell, wherein the portion of the second reset procedure comprises resetting a MAC layer of the protocol stack.

Aspect 8: The method of any of aspects 1 through 7, wherein receiving the second control message comprises: receiving an information element indicating that the second reset procedure is enabled or disabled.

Aspect 9: The method of any of aspects 1 through 8, wherein receiving the second control message comprises: receiving an L1 signal or an L2 signal that enables one of the first reset procedure or the second reset procedure.

Aspect 10: The method of any of aspects 1 through 9, further comprising: performing the first reset procedure or the second reset procedure based at least on part on the set of mobility parameters.

Aspect 11: The method of aspect 10, wherein the set of mobility parameters indicates one or more serving cells of the UE and one or more corresponding DUs.

Aspect 12: A method for wireless communication at a central unit (CU) comprising: outputting a first control message indicating a set of mobility parameters associated with a lower layer handover procedure, wherein the lower layer handover procedure comprises one of an L1 handover procedure or an L2 handover procedure; and outputting a second control message indicating one of a first reset procedure for the lower layer handover procedure or a second reset procedure for the lower layer handover procedure, wherein the first reset procedure indicates a first set of operating parameters for a higher layer than L1 and L2 in a protocol stack, and wherein the second reset procedure indicates a second set of operating parameters for the higher layer.

Aspect 13: The method of aspect 12 further comprising: communicating with a UE via a serving cell in accordance with the first set of operating parameters.

Aspect 14: The method of any of aspects 12 through 13, further comprising: communicating with a UE via a serving cell in accordance with the second set of operating parameters.

Aspect 15: The method of any of aspects 12 through 14, wherein outputting the second control message comprises: outputting an information element indicating that the second reset procedure is enabled or disabled.

Aspect 16: The method of any of aspects 12 through 15, wherein outputting the second control message comprises: outputting the second control message indicating the first reset procedure and the second reset procedure.

Aspect 17: The method of any of aspects 12 through 16, wherein the set of mobility parameters indicates one or more serving cells of a UE and one or more corresponding DUs.

Aspect 18: An apparatus for wireless communication at a UE, comprising a processor; memory coupled with the processor; and instructions stored in the memory and executable by the processor to cause the apparatus to perform a method of any of aspects 1 through 11.

Aspect 19: An apparatus for wireless communication at a UE, comprising at least one means for performing a method of any of aspects 1 through 11.

Aspect 20: A non-transitory computer-readable medium storing code for wireless communication at a UE, the code comprising instructions executable by a processor to perform a method of any of aspects 1 through 11.

Aspect 21: An apparatus comprising a processor; memory coupled with the processor; and instructions stored in the memory and executable by the processor to cause the apparatus to perform a method of any of aspects 12 through 17.

Aspect 22: An apparatus comprising at least one means for performing a method of any of aspects 12 through 17.

Aspect 23: A non-transitory computer-readable medium storing code the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a first control message indicating a set of mobility parameters associated with a lower layer handover procedure, wherein the lower layer handover procedure comprises one of a layer 1 handover procedure or a layer 2 handover procedure;

receiving a second control message indicating one of a first reset procedure for the lower layer handover procedure or a second reset procedure for the lower layer handover procedure, wherein the first reset procedure indicates a first set of operating parameters for a higher layer than both layer 1 and layer 2 in a protocol stack, wherein the second reset procedure indicates a second set of operating parameters for the higher layer; and performing the lower layer handover procedure based at least in part on the set of mobility parameters and one of the first reset procedure or the second reset procedure.

2. The method of claim 1, further comprising:

switching from a first serving cell to a second serving cell based at least in part on performing the lower layer handover procedure, wherein the first serving cell and the second serving cell correspond to a same distributed unit;

performing the first reset procedure based at least in part on switching to the second serving cell; and communicating with the second serving cell in accordance with the first set of operating parameters.

3. The method of claim 2, wherein performing the first reset procedure comprises:

applying the first set of operating parameters to the second serving cell, wherein the first set of operating parameters were previously applied to the first serving cell.

4. The method of claim 2, further comprising:

applying a secondary primary cell configuration to the second serving cell based at least in part on switching to the second serving cell.

5. The method of claim 1, further comprising:

switching from a first serving cell associated with a first distributed unit to a second serving cell associated with a second distributed unit based at least in part on performing the lower layer handover procedure;

performing the second reset procedure based at least in part on switching to the second serving cell; and communicating with the second serving cell in accordance with the second set of operating parameters.

6. The method of claim 5, wherein performing the second reset procedure comprises:

applying the second set of operating parameters to the second serving cell, wherein the second set of operating parameters reset the first set of operating parameters previously applied to the first serving cell.

7. The method of claim 5, wherein performing the second reset procedure comprises:

performing a portion of the second reset procedure based at least in part on switching to the second serving cell, wherein the portion of the second reset procedure comprises resetting a medium access control layer of the protocol stack.

8. The method of claim 1, wherein receiving the second control message comprises:

receiving an information element indicating that the second reset procedure is enabled or disabled.

9. The method of claim 1, wherein receiving the second control message comprises:

receiving a layer 1 signal or a layer 2 signal that enables one of the first reset procedure or the second reset procedure.

10. The method of claim 1, further comprising:

performing the first reset procedure or the second reset procedure based at least on part on the set of mobility parameters.

11. The method of claim 10, wherein the set of mobility parameters indicates one or more serving cells of the UE and one or more corresponding distributed units.

12. A method for wireless communication at a central unit (CU) comprising:

outputting a first control message indicating a set of mobility parameters associated with a lower layer handover procedure, wherein the lower layer handover procedure comprises one of a layer 1 handover procedure or a layer 2 handover procedure; and outputting a second control message indicating one of a first reset procedure for the lower layer handover procedure or a second reset procedure for the lower layer handover procedure, wherein the first reset procedure indicates a first set of operating parameters for a higher layer than both layer 1 and layer 2 in a protocol stack, and wherein the second reset procedure indicates a second set of operating parameters for the higher layer.

13. The method of claim 12 further comprising:

communicating with a user equipment (UE) via a serving cell in accordance with the first set of operating parameters.

14. The method of claim 12, further comprising:

communicating with a UE via a serving cell in accordance with the second set of operating parameters.

15. The method of claim 12, wherein outputting the second control message comprises:

outputting an information element indicating that the second reset procedure is enabled or disabled.

16. The method of claim 12, wherein outputting the second control message comprises:

outputting the second control message indicating the first reset procedure and the second reset procedure.

17. The method of claim 12, wherein the set of mobility parameters indicates one or more serving cells of a UE and one or more corresponding distributed units.

18. An apparatus for wireless communication at a user equipment (UE), comprising:

one or more processors;

one or more memories coupled with the one or more processors; and instructions stored in the one or more memories and executable by the one or more processors to cause the apparatus to:

receive a first control message indicating a set of mobility parameters associated with a lower layer handover procedure, wherein the lower layer handover procedure comprises one of a layer 1 handover procedure or a layer 2 handover procedure;

receive a second control message indicating one of a first reset procedure for the lower layer handover procedure or a second reset procedure for the lower layer handover procedure, wherein the first reset procedure indicates a first set of operating parameters for a higher layer than both layer 1 and layer 2 in a protocol stack, wherein the second reset procedure indicates a second set of operating parameters for the higher layer; and perform the lower layer handover procedure based at least in part on the set of mobility parameters and one of the first reset procedure or the second reset procedure.

19. The apparatus of claim 18, wherein the instructions are further executable by the one or more processors to cause the apparatus to:

switch from a first serving cell to a second serving cell based at least in part on performing the lower layer handover procedure, wherein the first serving cell and the second serving cell correspond to a same distributed unit;

perform the first reset procedure based at least in part on switching to the second serving cell; and communicate with the second serving cell in accordance with the first set of operating parameters.

20. The apparatus of claim 19, wherein the instructions to perform the first reset procedure are executable by the one or more processors to cause the apparatus to:

apply the first set of operating parameters to the second serving cell, wherein the first set of operating parameters were previously applied to the first serving cell.

21. The apparatus of claim 19, wherein the instructions are further executable by the one or more processors to cause the apparatus to:

apply a secondary primary cell configuration to the second serving cell based at least in part on switching to the second serving cell.

22. The apparatus of claim 18, wherein the instructions are further executable by the one or more processors to cause the apparatus to:

switch from a first serving cell associated with a first distributed unit to a second serving cell associated with a second distributed unit based at least in part on performing the lower layer handover procedure;

perform the second reset procedure based at least in part on switching to the second serving cell; and communicate with the second serving cell in accordance with the second set of operating parameters.

23. The apparatus of claim 22, wherein the instructions to perform the second reset procedure are executable by the one or more processors to cause the apparatus to:

apply the second set of operating parameters to the second serving cell, wherein the second set of operating parameters reset the first set of operating parameters previously applied to the first serving cell.

24. The apparatus of claim 22, wherein the instructions to perform the second reset procedure are executable by the one or more processors to cause the apparatus to:

perform a portion of the second reset procedure based at least in part on switching to the second serving cell, wherein the portion of the second reset procedure comprises resetting a medium access control layer of the protocol stack.

25. The apparatus of claim 18, wherein the instructions to receive the second control message are executable by the one or more processors to cause the apparatus to:

receive an information element indicating that the second reset procedure is enabled or disabled.

26. The apparatus of claim 18, wherein the instructions to receive the second control message are executable by the one or more processors to cause the apparatus to:

receive a layer 1 signal or a layer 2 signal that enables one of the first reset procedure or the second reset procedure.

27. An apparatus, comprising:

one or more processors;

one or more memories coupled with the one or more processors; and instructions stored in the one or more memories and executable by the one or more processors to cause the apparatus to:

output a first control message indicating a set of mobility parameters associated with a lower layer handover procedure, wherein the lower layer handover procedure comprises one of a layer 1 handover procedure or a layer 2 handover procedure; and output a second control message indicating one of a first reset procedure for the lower layer handover procedure or a second reset procedure for the lower layer handover procedure, wherein the first reset procedure indicates a first set of operating parameters for a higher layer than both layer 1 and layer 2 in a protocol stack, and wherein the second reset procedure indicates a second set of operating parameters for the higher layer.

28. The apparatus of claim 27, wherein the instructions are further executable by the one or more processors to cause the apparatus to:

communicate with a user equipment (UE) via a serving cell in accordance with the first set of operating parameters.

29. The apparatus of claim 27, wherein the instructions are further executable by the one or more processors to cause the apparatus to:

communicate with a UE via a serving cell in accordance with the second set of operating parameters.

30. The apparatus of claim 27, wherein the instructions to output the second control message are executable by the one or more processors to cause the apparatus to:

output an information element indicating that the second reset procedure is enabled or disabled.

* * * * *